United States Patent
Yamauchi

(10) Patent No.: US 7,509,090 B2
(45) Date of Patent: Mar. 24, 2009

(54) RADIO VIDEO TRANSMISSION SYSTEM AND METHOD

(75) Inventor: Masahiro Yamauchi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 364 days.

(21) Appl. No.: 10/553,203

(22) PCT Filed: Apr. 15, 2004

(86) PCT No.: PCT/JP2004/005348

§ 371 (c)(1),
(2), (4) Date: Oct. 13, 2005

(87) PCT Pub. No.: WO2004/093375

PCT Pub. Date: Oct. 28, 2004

(65) Prior Publication Data

US 2006/0227215 A1    Oct. 12, 2006

(30) Foreign Application Priority Data

Apr. 15, 2003 (JP) .............................. 2003-110820

(51) Int. Cl.
*H04H 7/00* (2006.01)
(52) U.S. Cl. .................. 455/3.06; 455/3.01; 455/420; 455/423
(58) Field of Classification Search ................ 455/3.06, 455/420, 423, 9, 41.2, 504, 566; 370/468; 375/240.12, 240.13; 348/193, 123, 723, 348/423.1, 14.08
See application file for complete search history.

(56) References Cited

U.S. PATENT DOCUMENTS

| | | | | | |
|---|---|---|---|---|---|
| 4,980,761 | A | * | 12/1990 | Natori | ...................... 348/14.08 |
| 5,428,388 | A | * | 6/1995 | von Bauer et al. | .......... 348/155 |
| 5,920,673 | A | * | 7/1999 | Yasukohchi et al. | ........... 386/46 |
| 2001/0021998 | A1 | * | 9/2001 | Margulis | ..................... 725/81 |
| 2002/0158991 | A1 | * | 10/2002 | Kobayashi et al. | .......... 348/723 |
| 2003/0165324 | A1 | * | 9/2003 | O'Connor et al. | ............. 386/69 |
| 2003/0231655 | A1 | * | 12/2003 | Kelton et al. | ................. 370/468 |
| 2004/0218672 | A1 | * | 11/2004 | Bourne et al. | .......... 375/240.12 |

FOREIGN PATENT DOCUMENTS

| | | |
|---|---|---|
| JP | 3-482 U | 1/1991 |
| JP | 8-274756 A | 10/1996 |
| JP | 10-173571 A | 6/1998 |
| JP | 11-341455 A | 12/1999 |
| JP | 2001-352314 A | 12/2001 |
| JP | 2002-335201 A | 11/2002 |
| JP | 2003-50677 A | 2/2003 |

\* cited by examiner

*Primary Examiner*—Tan Trinh
(74) *Attorney, Agent, or Firm*—Birch, Stewart, Kolasch & Birch, LLP

(57) ABSTRACT

The present invention provides a system and method for radio video transmission which switches a radio frequency band or a compression rate for video data to enable appropriate video transmission even if a radio environment is degraded. A pair of a transmitter and a receiver transmits video data in the radio environment. The receiver periodically transmits a status message to the transmitter. If the transmitter fails to receive reception of the periodically transmitted status message, the failure is used as a trigger to cause the transmitter to switch the channel (radio frequency band) or the video data compression rate. It is therefore possible to switch the radio frequency band or video data compression rate for the transmitter and receiver even if the radio environment is degraded.

7 Claims, 29 Drawing Sheets

RADIO VIDEO TRANSMISSION SYSTEM AND METHOD

TECHNICAL FIELD

The present invention relates to a system and method for radio video transmission which transmits video data by radio.

BACKGROUND ART

Conventional radio video transmission systems transmitting video data by radio include those which transmit video data from AV (Audio & Visual) equipment using a very weak radio wave and those which are utilized for Wireless LAN (Local Area Network) and which use a spectrum spread communication.

A television signal transmission apparatus described in JP Utility Model Publication (Kokai) No. 3-482 U (1991) is a specific example of a system transmitting video data using a very weak radio wave according to the above conventional technique. A radio video signal transmission and reception apparatus described in JP Patent Publication (Kokai) No. 10-173571 A (1998) is a specific example of a system transmitting video data using a spectrum spread communication.

Both radio video transmission systems may not transmit video data easily if their radio environments are degraded by interference by another piece of radio equipment or a change in the distance between a transmitter and a receiver resulting from operation during movement.

If video data cannot be transmitted easily, transmission of video data may be enabled by for example, switching a frequency band used for radio transmission or changing a compression rate for video data to reduce the amount of data transmitted.

Specifically, the receiver of the radio video transmission system receives video data to recognize the degradation of the radio environment. The receiver then transmits an instruction on the switching of the radio frequency band or the change in the compression rate for the video data, to the transmitter. Upon reception of the instruction, the transmitter executes a process in accordance with the instruction.

To achieve this, the user of the receiver recognizes the degradation of the radio environment while viewing and listening to the received video data. The user thus transmits the instruction on the switching of the radio frequency band or the compression rate for the video data, to the transmitter by radio.

Examples of documents relating to the above technique are listed below.

1) JP Utility Model Publication (Kokai) No. 3-482 U (1991)
2) JP Patent Publication (Kokai) No. 10-173571 A (1998)

However, these systems cannot enable the transmission if the radio environment is degraded to the degree that the receiver cannot transmit the instruction on the switching of the radio frequency band or the video data compression rate, to the transmitter. In this case, the user having recognized the degradation of the radio environment must directly visit the location of the transmitter and perform an operation for switching the radio frequency band or the video data compression rate. Accordingly, this user interface is disadvantageous.

The present invention is made in view of the above problems. It is an object of the present invention to provide a system and method for radio video transmission which allows the radio frequency band or the video data compression rate to be switched to enable appropriate video transmissions even if the radio environment is significantly degraded.

DISCLOSURE OF THE INVENTION

To accomplish the above object, the present invention provides a radio video transmission system which transmits video data from a transmitter to a receiver by radio, the system being characterized by comprising detecting means for detecting interruption of communication of data periodically transmitted by the receiver and channel switching means for switching a channel through which video data is transmitted to the receiver, in response to the detection, by the detecting means, of the interruption of the communication.

The present invention also provides a radio video transmission system which transmits video data from a transmitter to a receiver by radio, the system being characterized by comprising reception status analyzing means for analyzing a status of reception, by the receiver, of video data transmitted by the transmitter and transmitter transmission rate switching instructing means for transmitting, to the transmitter, an instruction on a change in a rate at which the transmitter transmits video data, according to results of the analysis by the reception status analyzing means.

The present invention also provides a radio video transmission system which transmits video data from a transmitter to a receiver by radio, the system being characterized by comprising reception status analyzing means for analyzing a status of reception, by the receiver, of video data transmitted by the transmitter and channel switching means for switching a channel through which video data is received from the transmitter and through which video data is transmitted to the transmitter, according to results of the analysis by the reception status analyzing means.

The present invention also provides a method for radio video transmission which transmits video data from a transmitter to a receiver by radio, the method being characterized by comprising a step of causing a receiver to periodically transmit video data, a step of detecting interruption of communication of data periodically transmitted by the receiver, and a step of switching a channel through which video data is transmitted to the receiver, when the interruption of the data communication with the receiver is detected.

These inventions enable appropriate video transmissions by switching a radio frequency band or a video data compression rate even if a radio environment is significantly degraded.

BEST MODE FOR CARRYING OUT THE INVENTION

With reference to the drawings, description will be given below taking the case in which the present invention is applied to a radio video transmission system based on a spectrum spread communication.

In the radio transmission system based on the spectrum spread communication, a transmitter and a plurality of receivers use carriers in the same frequency band to make asynchronous communications in a time division manner. This system switches the frequency band to a different one that does not interfere with this frequency band to enable other transmitter and receivers to communicate.

Thus, in the description below, the frequency bands are defined as channels, and the transmitter and receivers have three channels P, Q, and R that do not interfere with one another.

The present invention is applicable to any radio transmission systems that enable the above system. For example, the present invention is applicable to a radio transmission system utilizing a very weak radio wave.

FIRST EMBODIMENT

Figure 1:
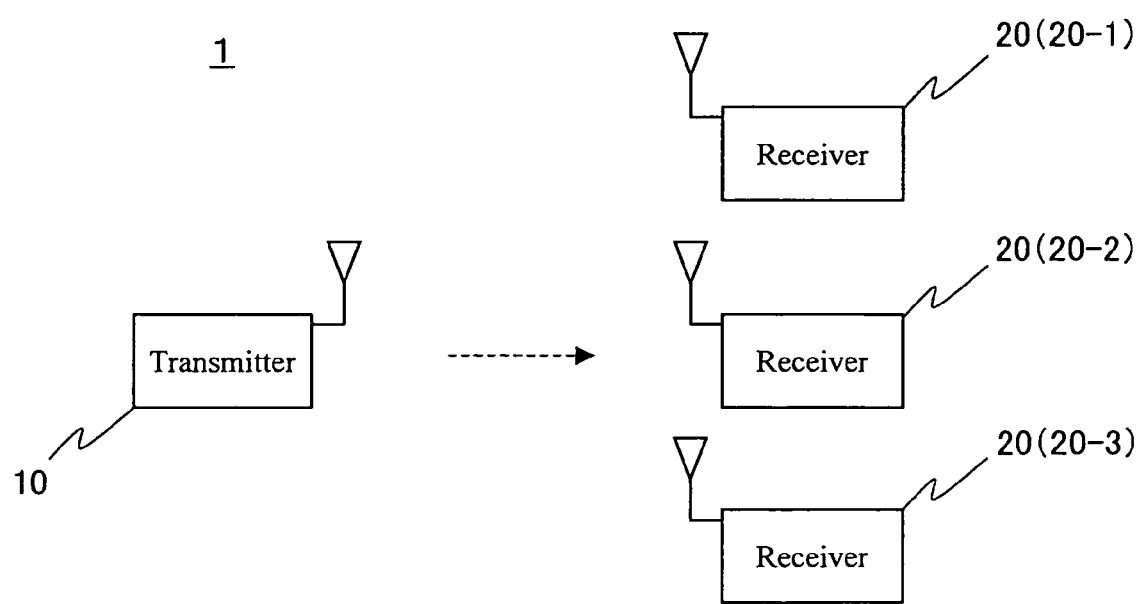
FIG. 1 is a diagram showing the configuration of a radio video transmission system according to a first embodiment of the present invention.

FIG. 1 is a diagram showing the configuration of a radio video transmission system according to the present embodiment.

For simplification, a radio video transmission system 1 according to the present embodiment comprises one transmitter 10 and three receivers 20-1, 20-2, and 20-3. The transmitter 10 and the receivers 20-1 to 20-3 are connected together using the radio transmission system based on the spectrum spread communication.

Figure 2:
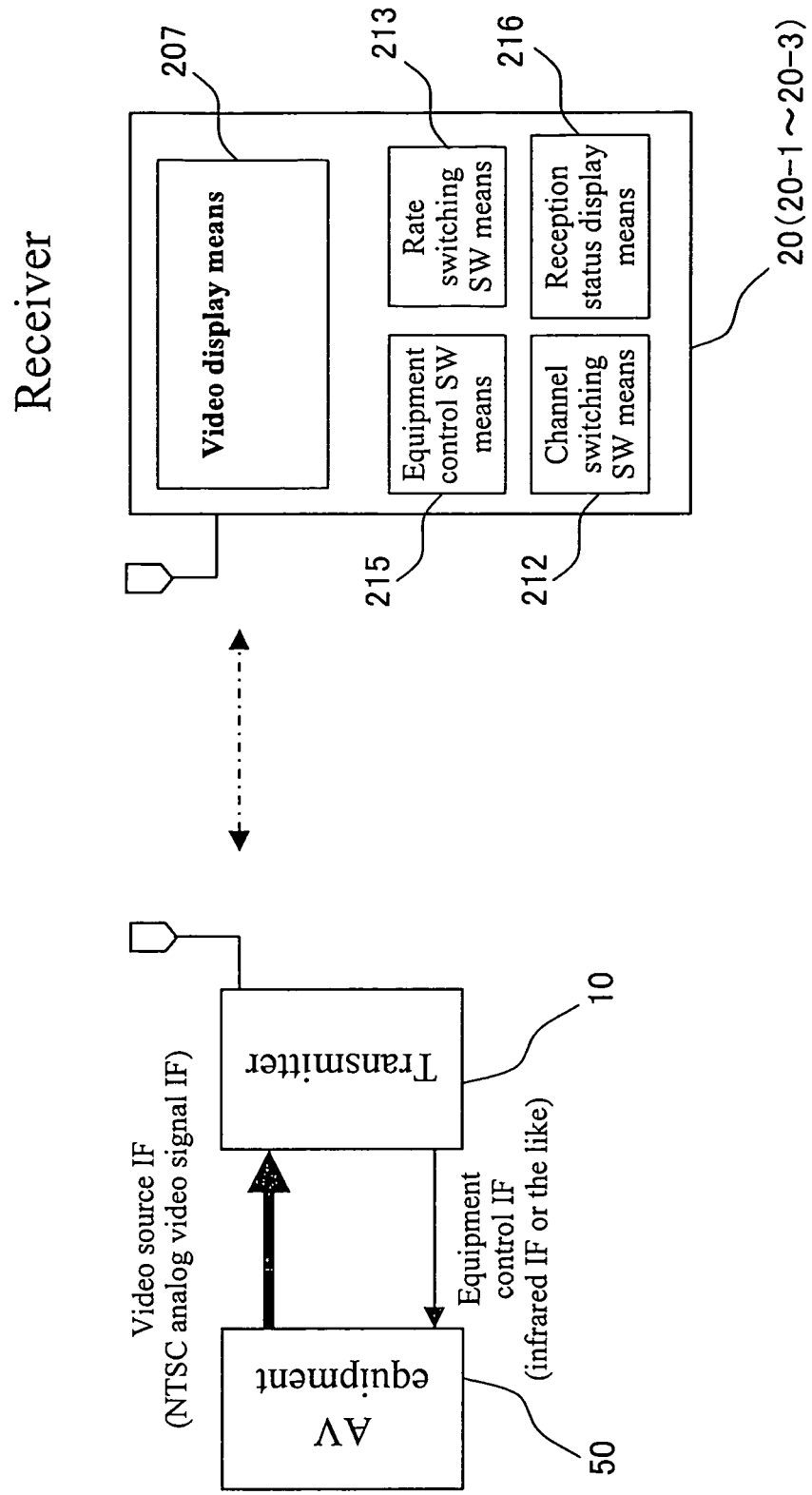
FIG. 2 is a diagram schematically illustrating equipment applied to the radio video transmission system according to the present embodiment.

In the radio video transmission system 1 according to the present embodiment, the transmitter 10 transmits one or more video sources, which are received by the receivers 20-1 to FIG. 2 is a diagram schematically showing equipment applied to the radio video transmission system according to the present embodiment.

The transmitter 10 is connected to AV equipment 50 such as a VTR (Video Tape Recorder), a TV tuner, or a DVD (Digital Versatile Disk) player. As an interface for video sources, the AV equipment 50 supplies NTSC (National Television System Committee) analog video signals to the transmitter 10. As an interface that controls the AV equipment 50, the transmitter 10 supplies outputs from an infrared remote controller to the AV equipment 50.

Each of the receivers 20-1 to 20-3 comprises video display means 207 such as a liquid crystal or a cathode-ray tube which displays video sources, equipment control switch means 215 (simply referred to as SW below) for controlling the AV equipment 50 connected to the transmitter 10, rate switching SW means 213 for switching the rate at which video sources are transmitted, channel switching SW means 212 for switching the channel through which video sources are transmitted, and reception status display means 216 for displaying a reception status.

Each of the SW means 212, 213, and 215 is composed of a mechanical switch, a SW displayed by software as a video, or the like. The reception status display means 216 uses display parts such as LEDs (Light Emitting Diodes) to show a reception status on the basis of the color of a lighting diode, the number of lighting diodes, or a numerical value expressed by lighting diodes, or uses the video display means 207 to display the reception status on a display screen for video sources.

Now, description will be given of the configuration of each of the transmitter 10 and receiver 20 according to the present embodiment.

Figure 3:
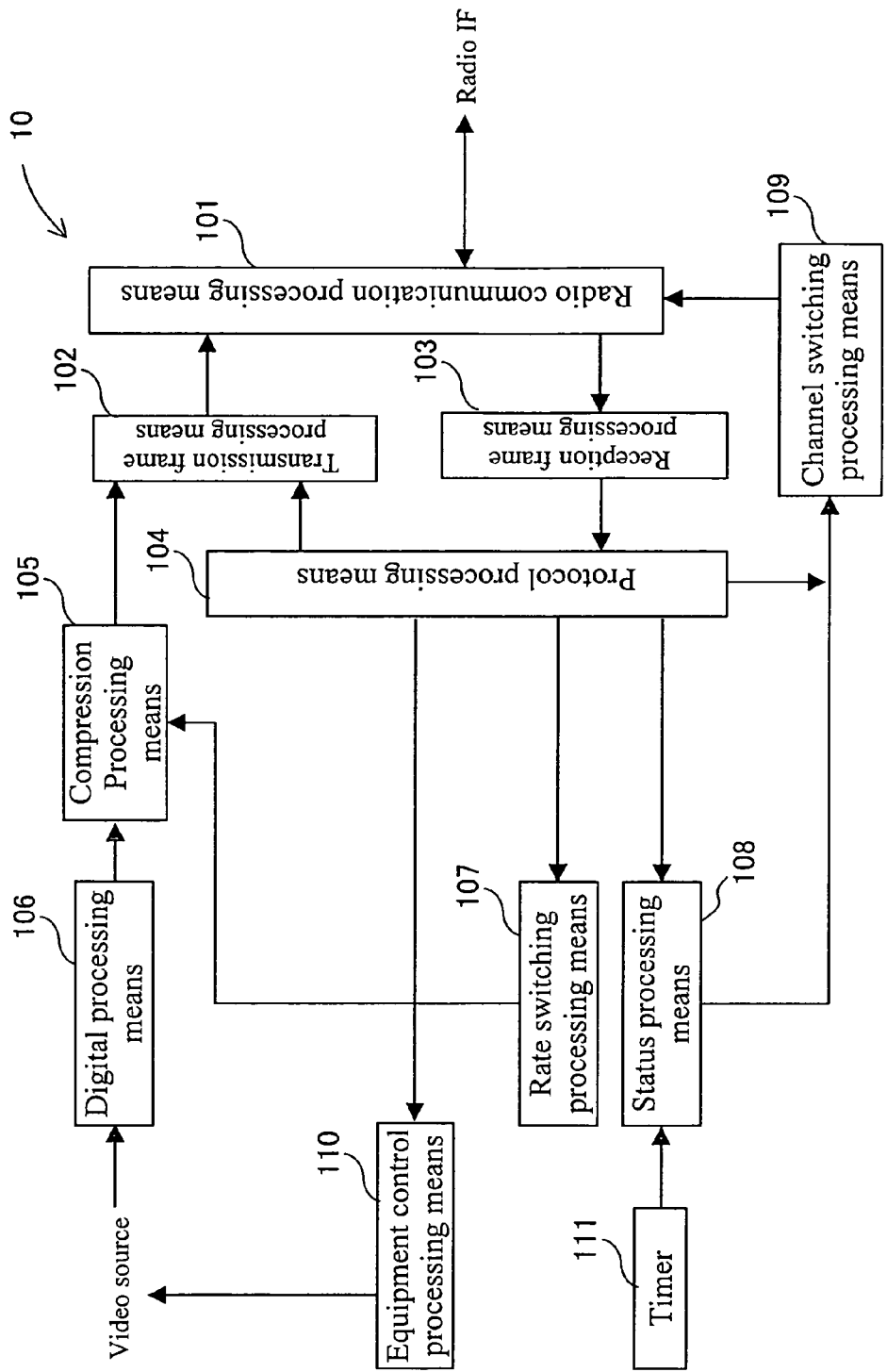
FIG. 3 is a diagram showing a transmitter according to the present embodiment.

FIG. 3 is a diagram showing the configuration of the transmitter according to the present embodiment.

The transmitter 10 is radio communication equipment that digitally processes an NTSC analog video signal input as a video source by the AV equipment 50 such as a VTR, a TV tuner, or a DVD player. The transmitter 10 then transmits the processed video signal to the plurality of receivers 20.

Thus, the transmitter 10 comprises radio communication processing means 101, transmission frame processing means 102, reception frame processing means 103, protocol processing means 104, compression processing means 105, digital processing means 106, rate switching processing means 107, status processing means 108, channel switching processing means 109, equipment control processing means 110 and a timer 111.

The radio communication processing means 101 uses a set predetermined channel to make radio communications. The radio communication processing means 101 transmits data from a radio transmission frame output by the transmission frame processing means 102. The radio communication processing means 101 receives, through a predetermined channel, data from a radio transmission frame destined for the radio communication processing means 101. The radio communication processing means 101 outputs the data to the reception frame processing means 103.

The transmission frame processing means 102 assembles compressed digital video data and a protocol message into a radio transmission frame; the compressed digital video data is output by the compression processing means 105 and the protocol message is output by the protocol processing means 104. The transmission frame processing means 102 outputs the radio transmission frame to the radio communication processing means 101.

Now, description will be given of the format of a radio transmission frame according to the present embodiment.

Figure 4:
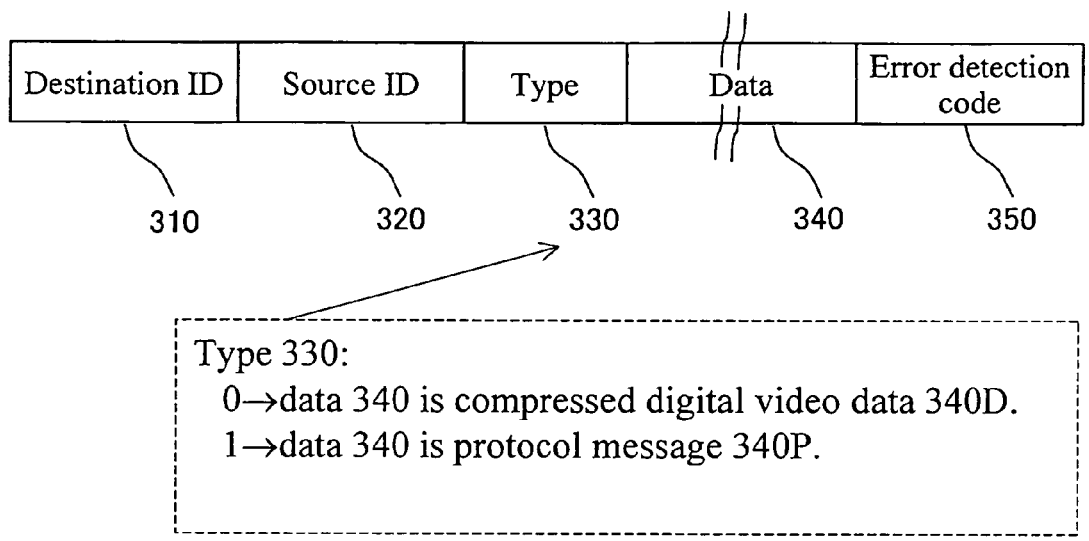
FIG. 4 is a diagram illustrating the format of a radio transmission frame according to the present embodiment.

FIG. 4 is a diagram illustrating the format of a radio transmission frame according to the present embodiment.

A radio transmission frame 300 is formatted to comprise a destination ID 310, a source ID 320, a type 330, data 340, and an error detection code 350.

The type 330 indicates the type of contents of the succeeding data 340. In the present embodiment, if the type has a value of "0", the data 340 is compressed digital video data 340D as shown in FIG. 6, described later. If the type has a value of "1", the data 340 is a protocol message 340P as shown in FIG. 5, described later.

The reception frame processing means 103 extracts the protocol message 340P from the radio transmission frame 300 output by the radio communication processing means 101. The reception frame processing means 103 outputs the protocol message 340P to the protocol processing means 104.

Now, description will be given of the format of a protocol massage 340P in a radio transmission frame according to the present embodiment.

Figure 5:
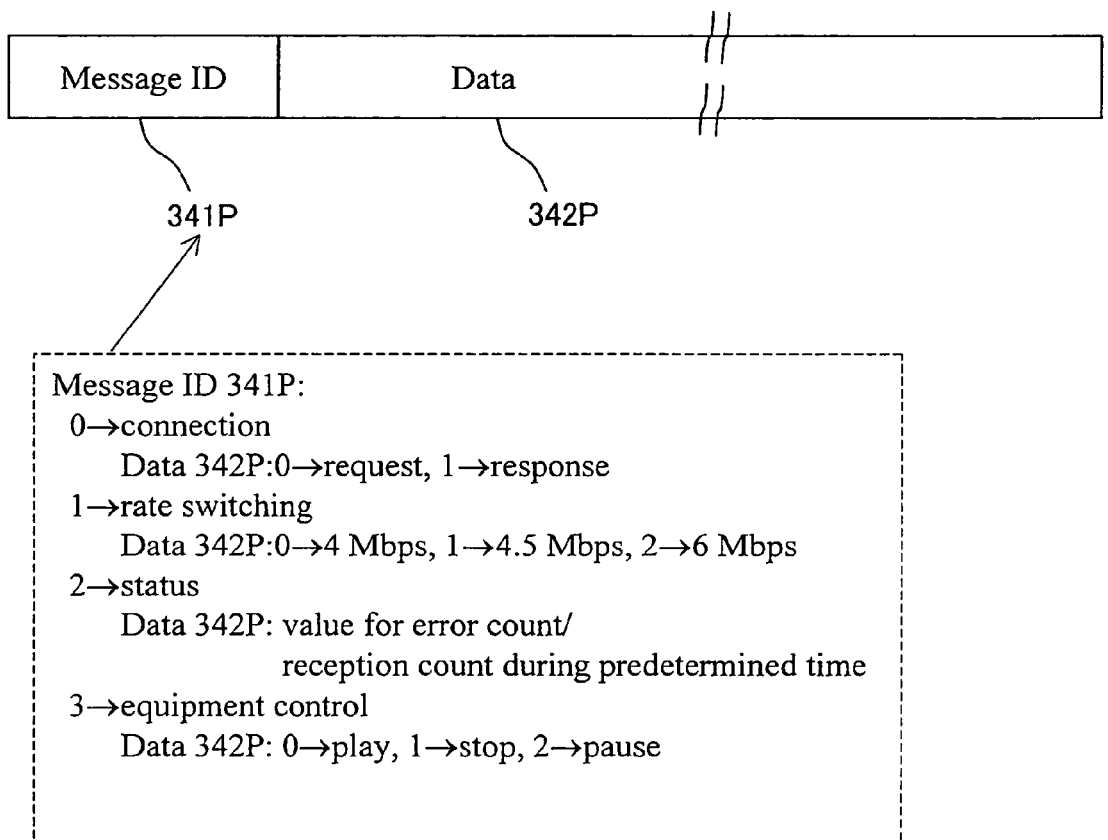
FIG. 5 is a diagram illustrating the format of a protocol massage in the radio transmission frame according to the present embodiment.
Figure 6:
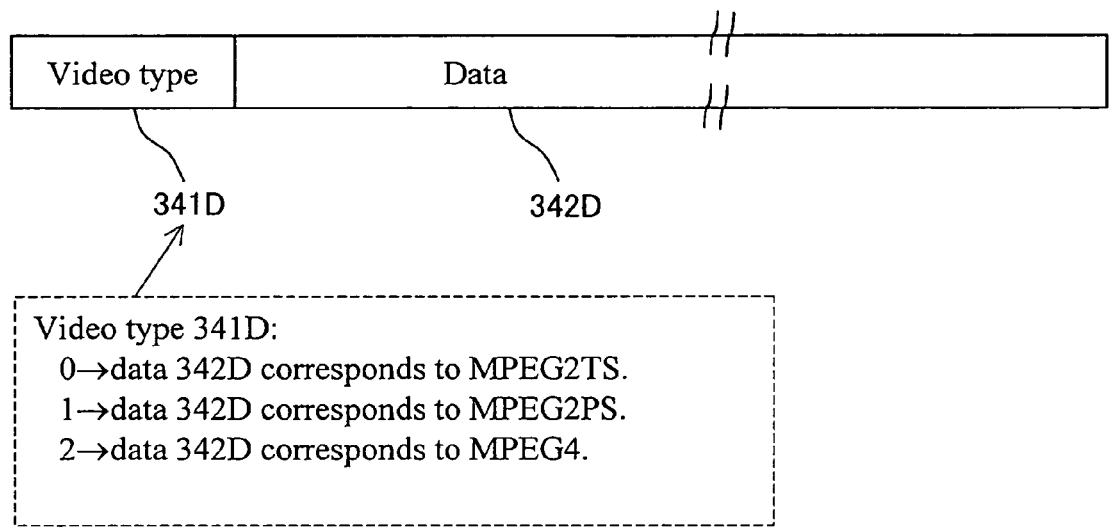
FIG. 6 is a diagram illustrating the format of compressed digital video data in the radio transmission frame according to the present embodiment.

FIG. 5 is a diagram illustrating the format of the protocol message in the radio transmission frame according to the present embodiment.

The protocol message 340P is formatted to comprise a message ID 341P and data 342P.

The message ID 341P indicates the type of the message. In the present embodiment, if the message ID 341P has a value of "0", the protocol message 340P relates to a "connection". If the message ID 341P has a value of "1", the protocol message 340P relates to "rate switching". If the message ID 341P has a value of "2", the protocol message 340P relates to a "status". If the message ID 341P has a value of "3", the protocol message 340P relates to "equipment control".

If the message ID 341P is "0 (connection)" and the succeeding data 342P is "0", the protocol message 340P indicates a "request". If the data 342P is "1", the protocol message 340P indicates a "response".

Similarly, if the message ID 341P is "1 (rate switching)" and the succeeding data 342P is "0", the protocol message 340P is a message on switching to a transmission rate of 4 Mbps. If the data 342P is "1", the protocol message 340P is a message on switching to a transmission rate of 4.5 Mbps. If the data 342P is "2", the protocol message 340P is a message on switching to a transmission rate of 6 Mbps.

If the message ID 341P is "2 (status)", the succeeding data 342P is a data value for the reception status (ratio of an error count to a reception count).

If the message ID 341P is "3 (equipment control)" and the succeeding data 342P is "0", the protocol message 340P is a "play" equipment control message. If the data 342P is "1", the protocol message 340P is a "stop" equipment control message. If the data 342P is "2", the protocol message 340P is a "pause" equipment control message.

The protocol processing means 104 executes a protocol for radio video transmission and transmits the transmission protocol message 340P to the transmission frame processing means 102. The protocol processing means 104 outputs the reception protocol message 340P input by the reception frame processing means 103, to the corresponding sections.

That is, if the protocol message 340P is a "rate switching" message the protocol processing means 104 outputs the data (rate switching value) indicative of a switching transmission rate to the rate switching processing means 107. If the protocol message 340P is a "status" message, the protocol processing means 104 outputs the reception status (ratio of the error count to the reception count) indicated by the data to the status processing means 108. If the protocol message 340P is an "equipment control" message, the protocol processing means 104 outputs the equipment control message such as "play", "stop", or "pause" indicated by the data to the equipment control processing means 110.

The protocol processing means 104 executes a connection procedure after power-on and outputs an instruction on channel switching to the channel switching processing means 109.

On the other hand, the digital processing means 106 converts a video source consisting of an input analog NTSC video signal into a digital signal. The digital processing means 106 then outputs the resulting digital video data to the compression processing means 105.

The compression processing means 105 generates compressed digital video data 340D by using a compression system such as MPEG2-TS (Moving Picture Experts Group 2-Transport Stream), MPEG2-PS (Moving Picture Experts Group 2-Program Stream), or MPEG4 to compress the digital video data in the video source output by the digital processing means 106. The compression processing means 105 then outputs the compressed digital video data 340D to the transmission frame processing means 102. A relevant compression rate is set on the basis of an instruction from the rate switching processing means 107. The compression rate is expressed in terms of a transmission rate such as 4 Mbps, 4.5 Mbps, or 6 Mbps.

Now, description will be given of the format of the compressed digital video data 340D according to the present embodiment.

FIG. 6 is a diagram illustrating the format of the compressed digital video data in a radio transmission frame according to the present embodiment.

The compressed digital video data 340D is formatted to comprise a video type 341D and data 342D.

The video type 341D indicates a compression system for the succeeding digital video data 342D. In the present embodiment, if the value for the type is "0", the succeeding digital video data 342D is compressed using the MPEG2-TS compression system. Similarly, if the value for the type is "1", the succeeding digital video data 342D is compressed using the MPEG2-PS compression system. If the value for the type is "2", the succeeding digital video data 342D is compressed using the MPEG4 compression system. The compressed digital video data 340D is the digital video data from the video source compressed using the compression systems.

The rate switching processing means 107 outputs an instruction on setting of a compression rate to the compression processing means 105 using a rate switching value output by the protocol processing means 104.

The status processing means 108 statistically processes the reception status of the receiver 20 output by the protocol processing means 104. The status processing means 108 outputs an instruction on switching of the radio channel to the channel switching processing means 109.

The channel switching processing means 109 switches a channel (frequency band) used by the radio communication processing means 101 for transmissions and receptions, to a different predetermined one in response to the instruction from the status processing means 108 and the instruction from the protocol processing means 104.

The equipment control processing means 110 converts equipment control data output by the protocol processing means 104 into remote control codes used to control the AV equipment 50. The equipment control processing means 110 outputs the codes to the infrared remote controller.

A timer 111 outputs periodic timings to the status processing means 108.

In connection with the transmitter 10 configured as described above, each of the receivers 20 (20-1 to 20-3) according to the present embodiment is configured as described below.

Figure 7:
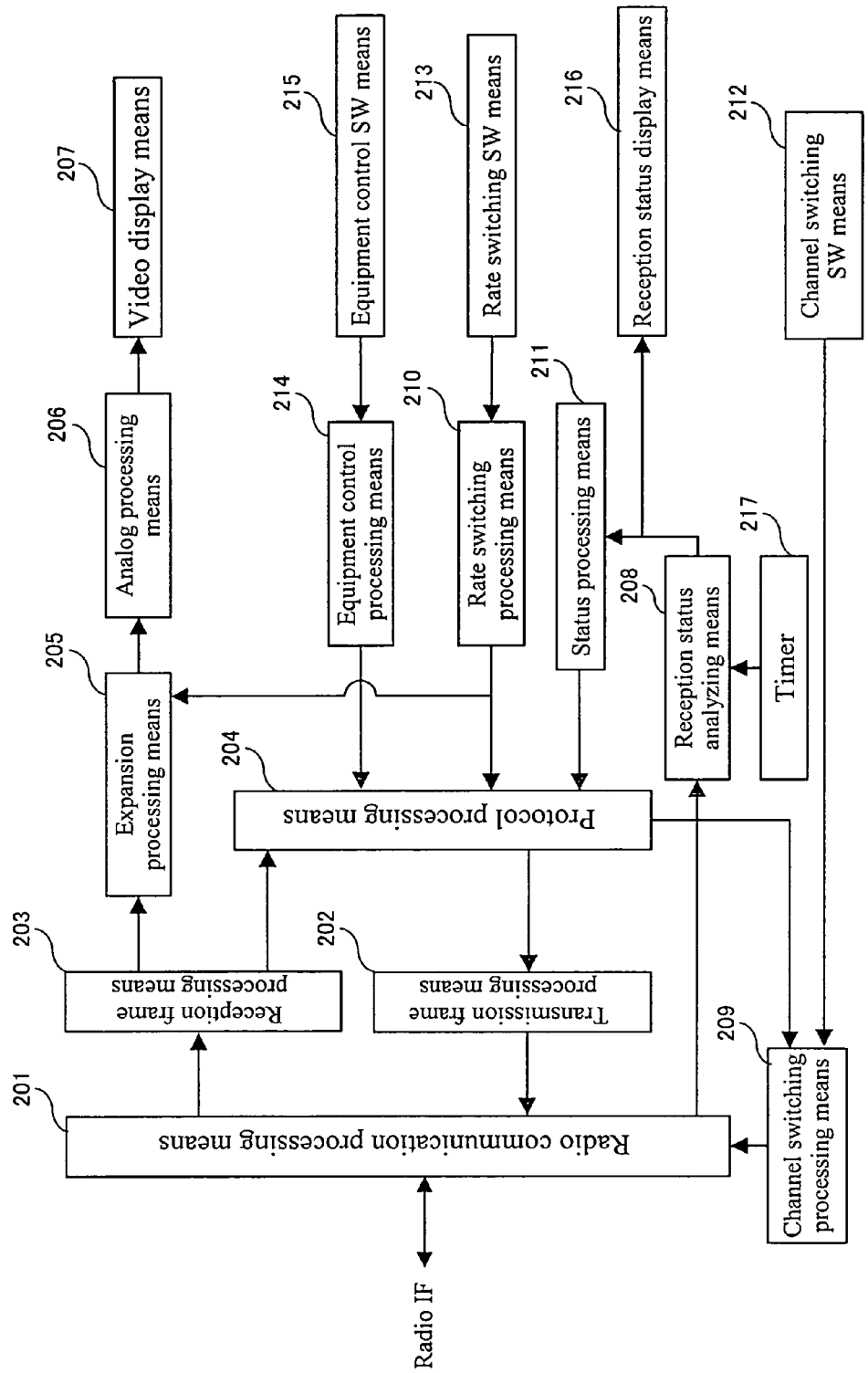
FIG. 7 is a diagram showing the configuration of a receiver according to the present embodiment.

FIG. 7 is a diagram showing the configuration of the receiver according to the present embodiment.

The receiver 20 is AV equipment containing a radio communication function; the receiver 20 receives compressed digital video data transmitted by the transmitter 10 and displaying a video source from the compressed digital video data.

Thus, the receiver 20 comprises radio communication processing means 201, transmission frame processing means 202, reception frame processing means 203, protocol processing means 204, expansion processing means 205, analog processing means 206, video display means 207, reception status analyzing means 208, channel switching processing means 209, rate switching processing means 210, status processing means 211, channel switching SW means 212, rate switching SW means 213, equipment control processing means 214, equipment control SW means 215, reception status display means 216, and a timer 217.

The radio communication processing means 201 uses a set predetermined channel to execute radio communication on the basis of the spectrum spread communication. The radio communication processing means 201 transmits data from the radio transmission frame 300 output by the transmission frame processing means 202. The radio communication processing means 201 receives the data from the radio transmission frame 300 destined for the radio communication processing means 201. The radio communication processing means 201 outputs the data to the reception frame processing means 203.

The transmission frame processing means 202 assembles the protocol message 340P output by the protocol processing means 204 shown in FIG. 5 into the radio transmission frame 300 shown in FIG. 4. The transmission frame processing means 202 then outputs the assembled message to the radio communication processing means 201.

The reception frame processing means 203 extracts the protocol message 340P, shown in FIG. 5, and the compressed digital video data 340D, shown in FIG. 6, from the radio transmission frame 300 output by the radio communication processing means 201 and shown in FIG. 4. The reception frame processing means 203 outputs the protocol message 340P and compressed digital video data 340D to the protocol processing means 204 and expansion processing means 205.

The protocol processing means 204 outputs the transmission protocol message 340P to the transmission frame processing means 202. The reception protocol message 340P output by the reception frame processing means 203 is input to the protocol processing means 204, which executes a protocol for radio video transmission.

The following are also input to the protocol processing means 204: equipment control data from the equipment control processing means 214, a rate switching value from the rate switching processing means 210, a reception status from the status processing means 211. The protocol processing means 204 executes a protocol for radio video transmission to transmit the transmission protocol message 340P to the transmission frame processing means 102.

The protocol processing means 204 executes a connection procedure after power-on and outputs an instruction on switching of a channel to the channel switching processing means 209.

The expansion processing means 205 decodes the compressed digital video data 340D output by the reception frame processing means 203 and shown in FIG. 6. The expansion processing means 205 thus executes a expansion process corresponding to a video type. The expansion processing means 205 then outputs the processed digital video data to the analog processing means 206.

In this case, the expansion processing means 205 executes an MPEG2-TS expansion process. Moreover, the expansion processing means 205 is configured to vary the expansion rate depending on the compression rate for the compressed digital video data 340D.

The analog processing means 206 converts the digital video data output by the expansion processing means 205 into analog signal. The analog processing means 206 outputs the resulting NTSC analog video signal to the video display means 207.

The video display means 207 is a display device to which the NTSC analog video signal output by the analog processing means 206 is input and which displays a received video source.

The reception status analyzing means 208 statistically processes data received by the radio communication processing means 201. The reception status analyzing means 208 outputs a reception status (in the present embodiment, a value for the rate of the number of radio transmission frames 300 received during a specified time which number is taken up by the number of those of the radio transmission frames 300 which have failed to be accurately received, that is, the ratio of the error count to the reception count) to the status processing means 211 and the reception status display means 216.

The channel switching processing means 209 switches a channel (frequency band) used by the radio communication processing means 201 for transmissions and receptions, to a predetermined one in response to an instruction from the channel switching SW means 212 and the instruction from the protocol processing means 204.

The rate switching processing means 210 outputs an instruction on rate switching given by the rate switching SW means 213 to the protocol processing means 204.

The status processing means 211 outputs a reception status output by the reception status analyzing means 208 to the protocol processing means 204.

The channel switching SW means 212 is a SW input by the user to switch the channel (frequency band) and outputs an instruction on channel switching to the channel switching processing means 209.

The rate switching SW means 213 a SW input by the user to switch the transmission rate and outputs a rate switching value to the rate switching processing means 210.

The equipment control processing means 214 outputs, to the protocol processing means 204, the equipment control data corresponding to an equipment control instruction output by the equipment control SW means 215.

The equipment control SW means 215 is a SW input by the user to control the transmitter 10 and the AV equipment 50, connected to the transmitter 10. In this case, an instruction on playing, stopping, pausing, or the like of a video source is output to the equipment control processing means 214.

The reception status display means 216 visually displays the reception status output by the reception status analyzing means 208.

The timer 217 outputs periodic timings required to determine the reception status, to the reception status analyzing means 208.

Now, with reference to the drawings, description will be given of the procedure in which the transmitter 10 and receiver 20 transmit video data configured as described above transmit data.

[Video Transmission Process Procedure]

Figure 8:
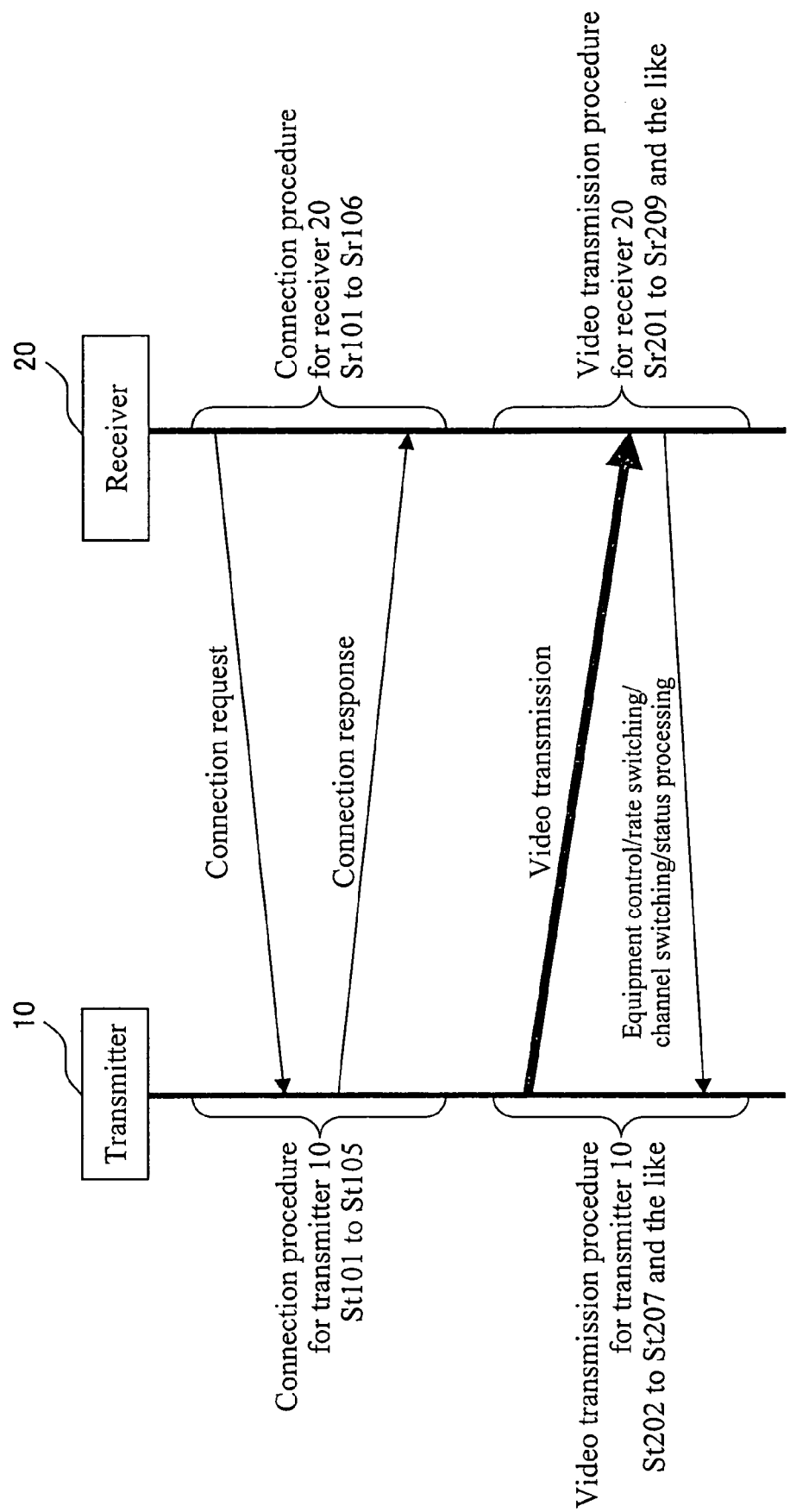
FIG. 8 is a diagram illustrating a procedure of video transmission between a pair of a transmitter and a receiver according to the present embodiment.

FIG. 8 is a diagram illustrating a procedure of transmitting video between a pair of the transmitter and receiver according to the present embodiment.

In FIG. 8, the video transmission process procedure is roughly composed of a "connection procedure" and a "video transmission procedure".

The "connection procedure" is a process procedure in which the transmitter 10 and the receiver 20 select the same channel from a plurality of channels to transmit video by radio and make radio communications.

On the other hand, in the "video transmission procedure", the transmitter 10 and the receiver 20 utilize the same channel selected during the "connection procedure". The transmitter 10 transmits a video source to the receiver 20. The receiver 20 receives the video source from the transmitter 10 to display it. The receiver 20 also transmits a message controlling the video source to the transmitter 10, to control the video source.

Further, the user sets IDs for the transmitter 10 and receiver 20 in order to identify them. That is, predetermined IDs are assigned to the transmitter 10 and receiver 20. The IDs for equipment identification are utilized as a destination ID and a source ID when the radio communication processing means 101 and 201 of the equipment 10 and 20 transmit, by radio, the protocol message 340P shown in FIG. 5, in the radio transmission frame 300 shown in FIG. 4.

Now, the "connection procedure" will be described in detail.

[Connection Procedure]

Figure 9:
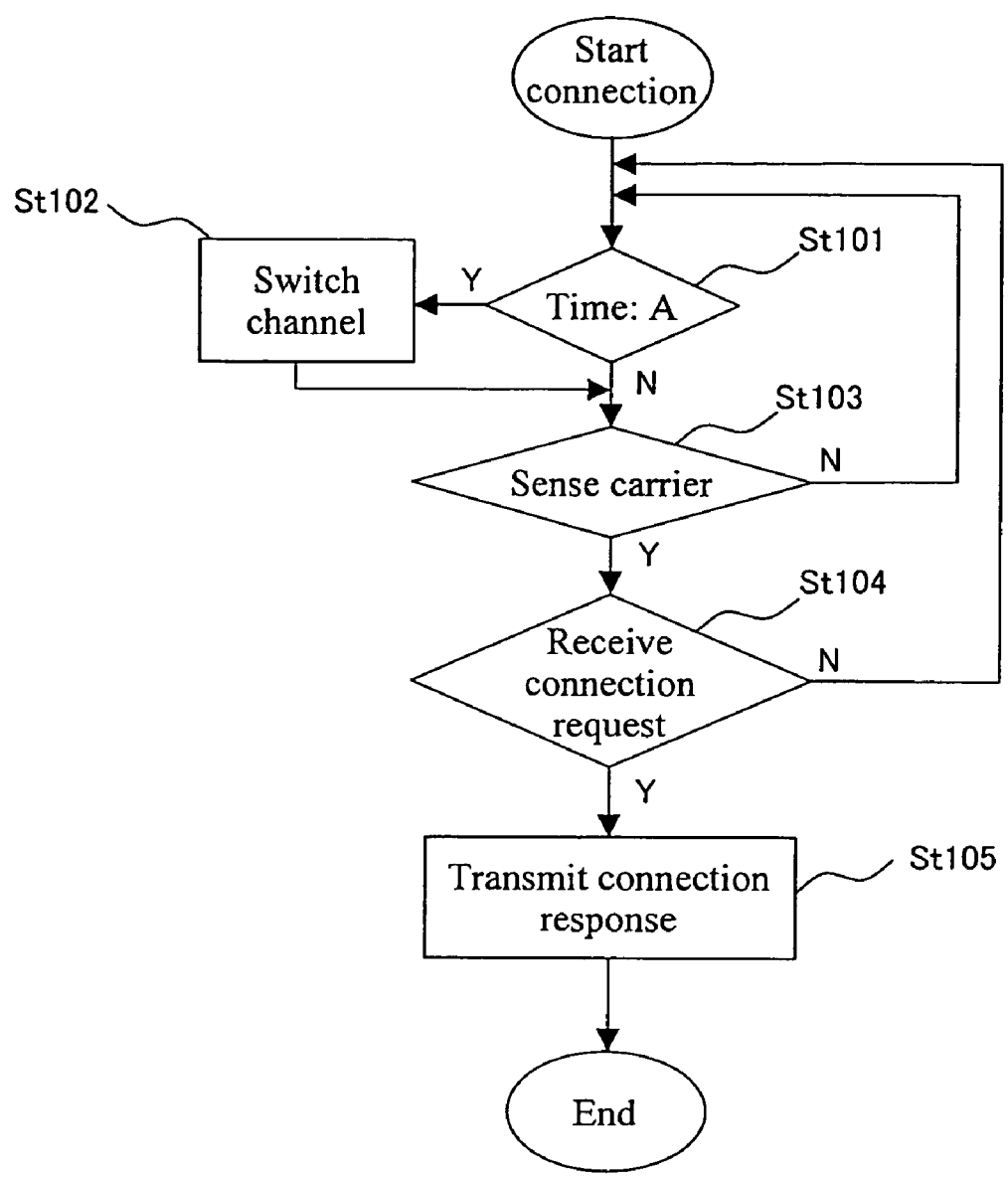
FIG. 9 is a flowchart of a connection procedure executed by the transmitter for video transmission according to the present embodiment.

FIG. 9 is a flowchart of a connection procedure executed by the transmitter for video transmission.

When powered on, the transmitter 10 executes the connection procedure shown in the flowchart in FIG. 9 using the radio communication processing means 101, transmission frame processing means 102, reception frame processing means 103, protocol processing means 104, and channel switching processing means 109.

When a predetermined time interval (time A) elapses (step St101), the transmitter 10 switches the channel (the frequency band in which radio transmissions are carried out) to the next one (step St102).

If the predetermined time A has not elapsed yet, the transmitter 10 detects the presence or absence of a carrier signal in that channel (step St103). If the transmitter 10 can detect a carrier signal, it executes a process of receiving a connection request message (see FIG. 5; the word "message" will be omitted below) from the receiver 20. If the transmitter 10 receives a connection request from the receiver 20, it transmits a connection response (see FIG. 5) to the receiver 20 (step St105) to finish the sequence. This fixes the channel for the transmitter 10.

In contrast, if the transmitter 10 cannot detect any carrier signal during the processing in step St103 or if in spite of the successful detection of a carrier signal, the transmitter 10 cannot receive a connection request from the receiver 20 during the process of receiving a connection request in step St104, it returns to the process of checking whether or not the time A has elapsed (step St101) to repeat the sequence.

Figure 10:
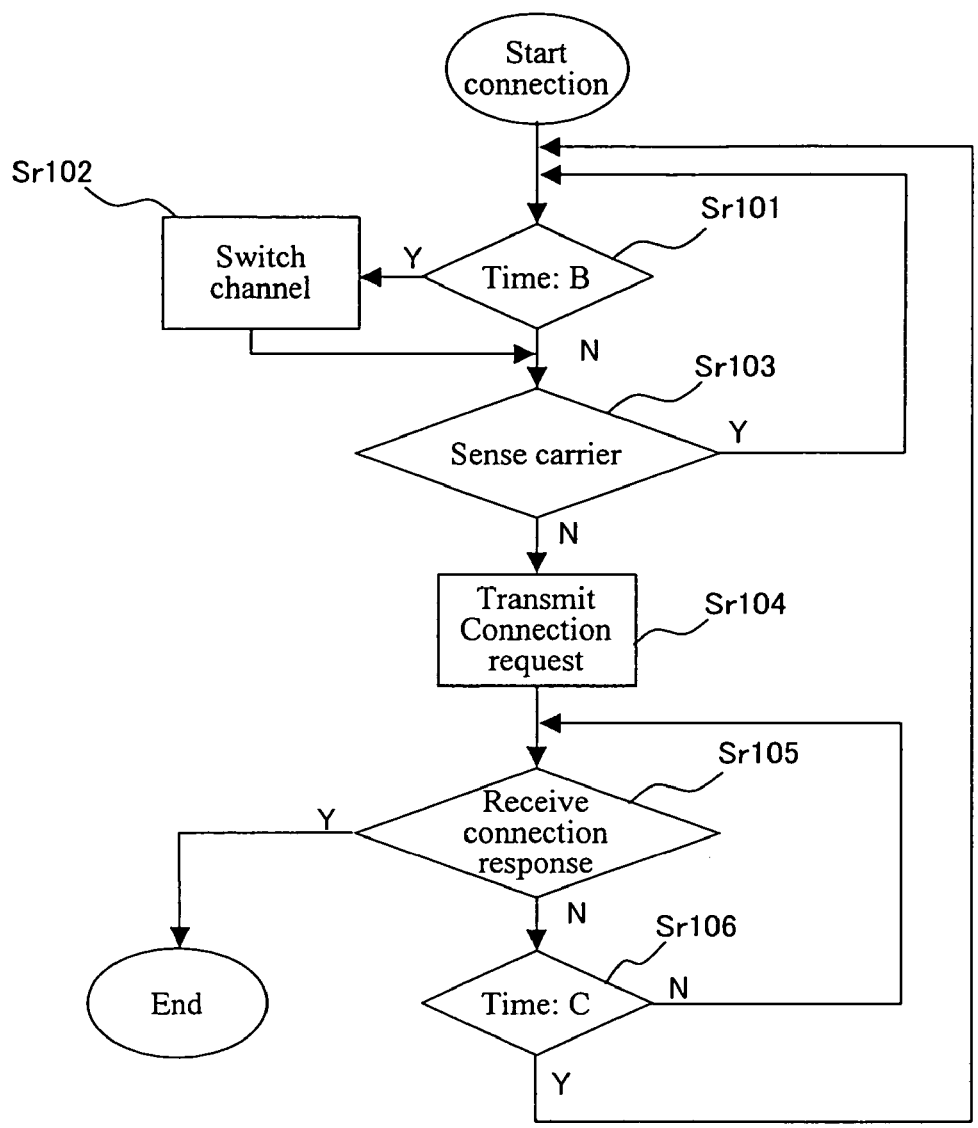
FIG. 10 is a flowchart of the connection procedure executed by the receiver for video transmission according to the present embodiment.

FIG. 10 is a flowchart of a connection procedure executed by the receiver for video transmission.

On the other hand, when powered on, the receiver 20 executes the connection procedure shown in the flowchart in FIG. 10 using the radio communication processing means 201, transmission frame processing means 202, reception frame processing means 203, protocol processing means 204, and channel switching processing means 209, shown in FIG. 7.

When a predetermined time interval (time B) elapses (step SR101), the receiver 20 switches the channel (the frequency band in which radio transmissions are carried out) to the next one (step Sr102).

If the predetermined time B has not elapsed yet, the receiver 20 detects the presence or absence of a carrier signal in that channel (step Sr103). If the receiver 20 does not detect any carrier signal, it transmits a connection request to the transmitter 10 (step Sr104).

After transmitting the connection request to the transmitter 10, the receiver 20 executes a process of receiving a connection response to the receiver 20 from the transmitter 10 (step Sr105), for a predetermined time C (step Sr106).

If the receiver 20 cannot receive a connection response to the receiver 20 from the transmitter 10 even after the predetermined time C has elapsed (step Sr106), it returns to the checking of whether or not the time B for channel switching has elapsed (step Sr101). The receiver thus repeats the sequence.

Here, the receiver 20 receives a connection response to the receiver 20 from the transmitter 10 (step Sr105) to finish the repetition of the sequence. As a result, radio communication can be made between the transmitter and the receiver using the same channel. This fixes that channel for the receiver 20.

Figure 11:
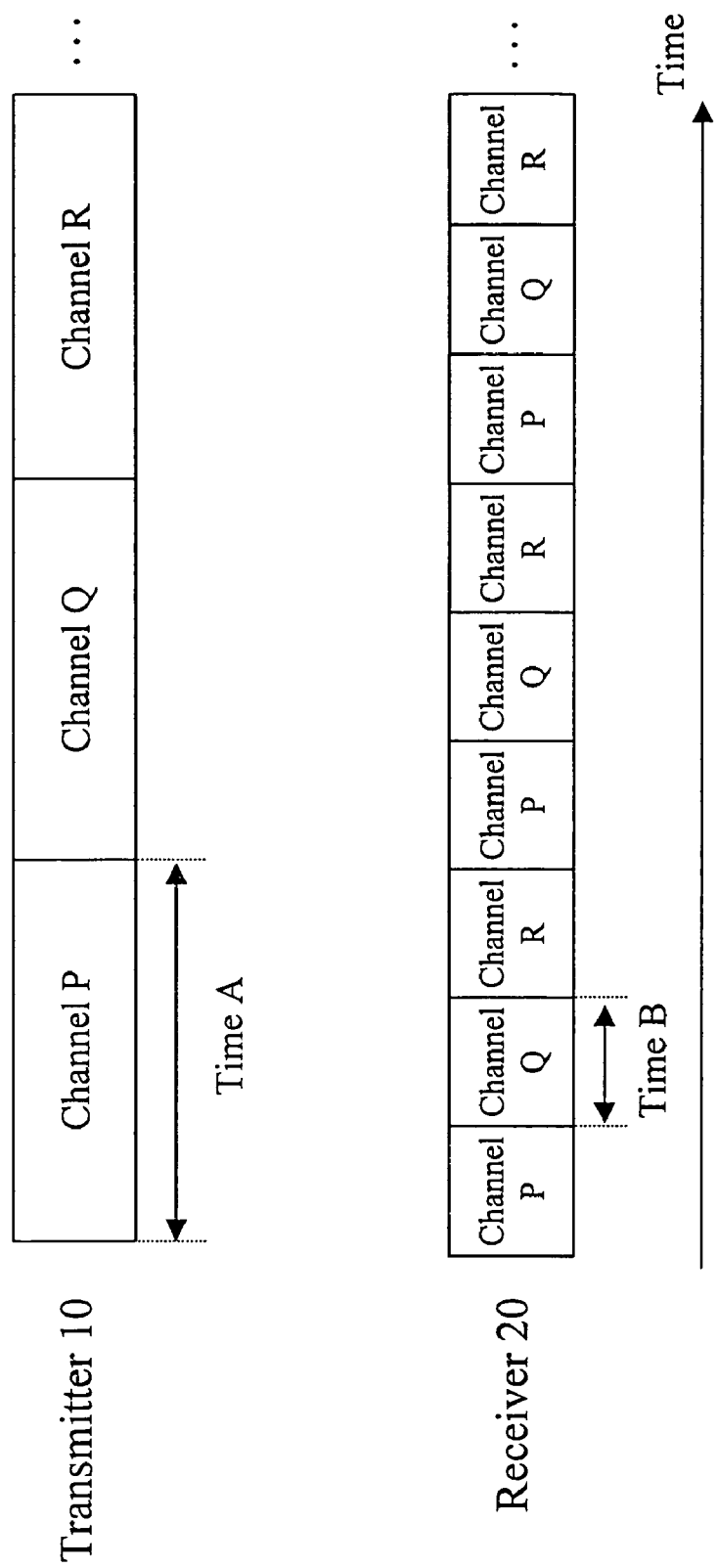
FIG. 11 is a diagram showing the relationship between channel switching times of the transmitter and channel switching times of the receiver in the connection procedure according to the present embodiment.

FIG. 11 is a diagram showing the relationship between channel switching times of the transmitter and receiver during the connection procedure.

In this case, in the present embodiment, the time (A) required for the transmitter 10 to detect a carrier signal on one channel is set three times as long as that (B) required for the receiver 20 to detect a carrier signal on one channel.

In FIG. 11, in connection with selection of the same channel for the transmitter 10 and the receiver 20, when they switch the channel in order of P, Q, R, P, . . . , they are ensured to encounter the same channel for every up to two switching operations for the receiver 10 and for every up to eight switching operations for the receiver 20.

For a plurality of receivers 20 (20-1 to 20-3), the same channel is selected for the first receiver 20-1 and the transmitter 10. Only the second receiver 20-2 executes the channel switching process shown in FIG. 10 to select the same channel.

Figure 12:
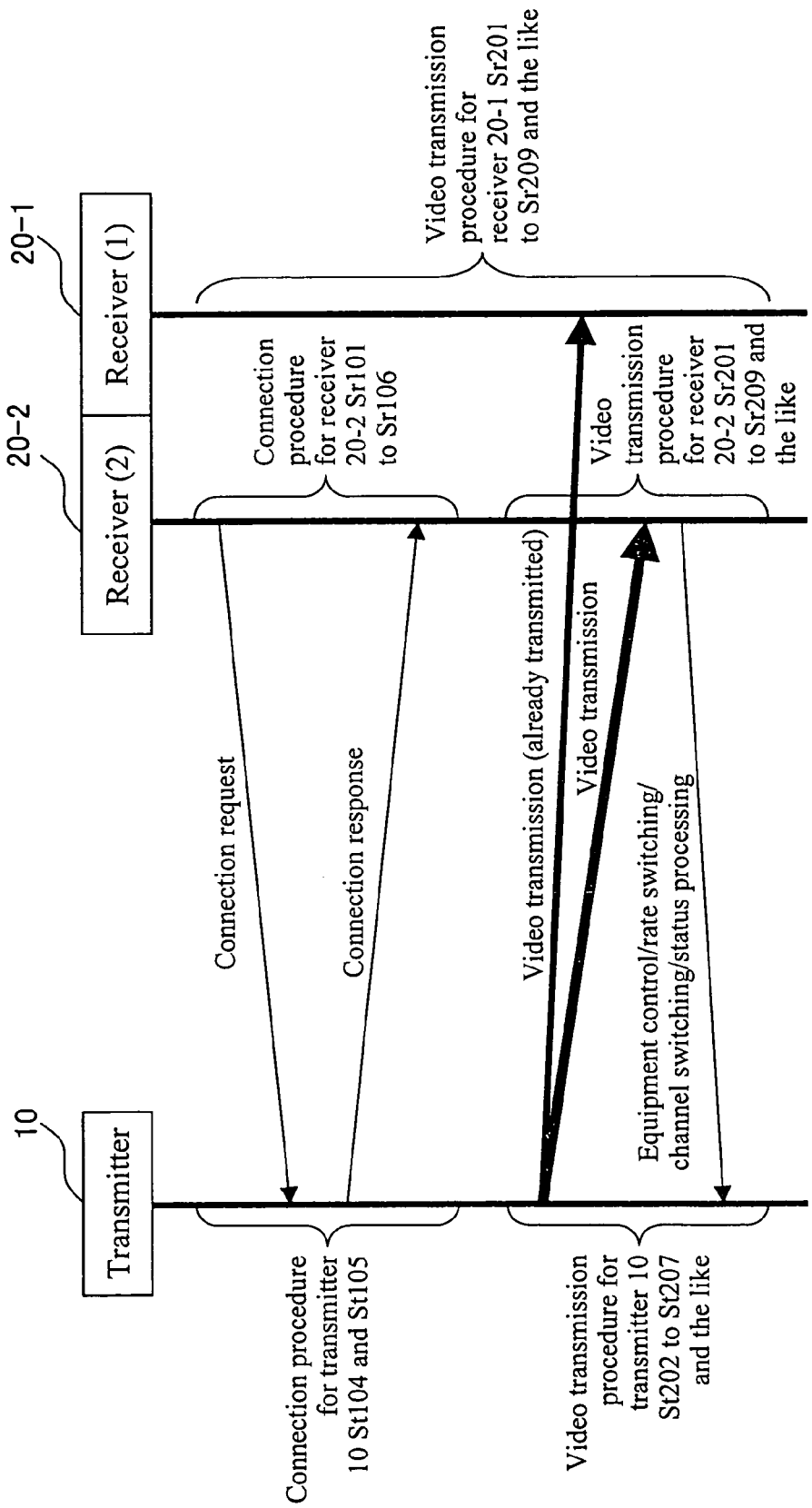
FIG. 12 is a diagram illustrating a procedure of video transmission between one transmitter and a plurality of receivers according to the present embodiment.

FIG. 12 is a diagram illustrating a procedure of video transmissions between one transmitter and a plurality of receivers according to the present embodiment.

Therefore, the transmitter 10 has only to execute steps St104 and St105 to connect to the second and third receivers 20-2 and 20-3.

[Video Transmission Procedure]

Once the above "connection procedure" allows the transmitter 10 and the receiver 20 to communicate with each other through the same channel, they execute a "video transmission procedure" to transmit a video source or the like by radio as shown in FIGS. 8 and 12.

In a "video-related process" in the "video transmission procedure", the transmitter 10 transmits the compressed digital video data 340D as a video source. The receiver 20 connected to the transmitter 10 through the channel receives the compressed digital video data 340D. The receiver 20 then displays the video source on the display device of the video display means 207.

Moreover, in the present embodiment, in a "protocol-related process" in the "video transmission procedure", the receiver 20 connected to the transmitter 10 through the channel transmits the protocol message 340P shown in FIG. 5. The transmitter 10 then executes a protocol process corresponding to the protocol message 340P.

[Video-Related Process]

Figure 13:
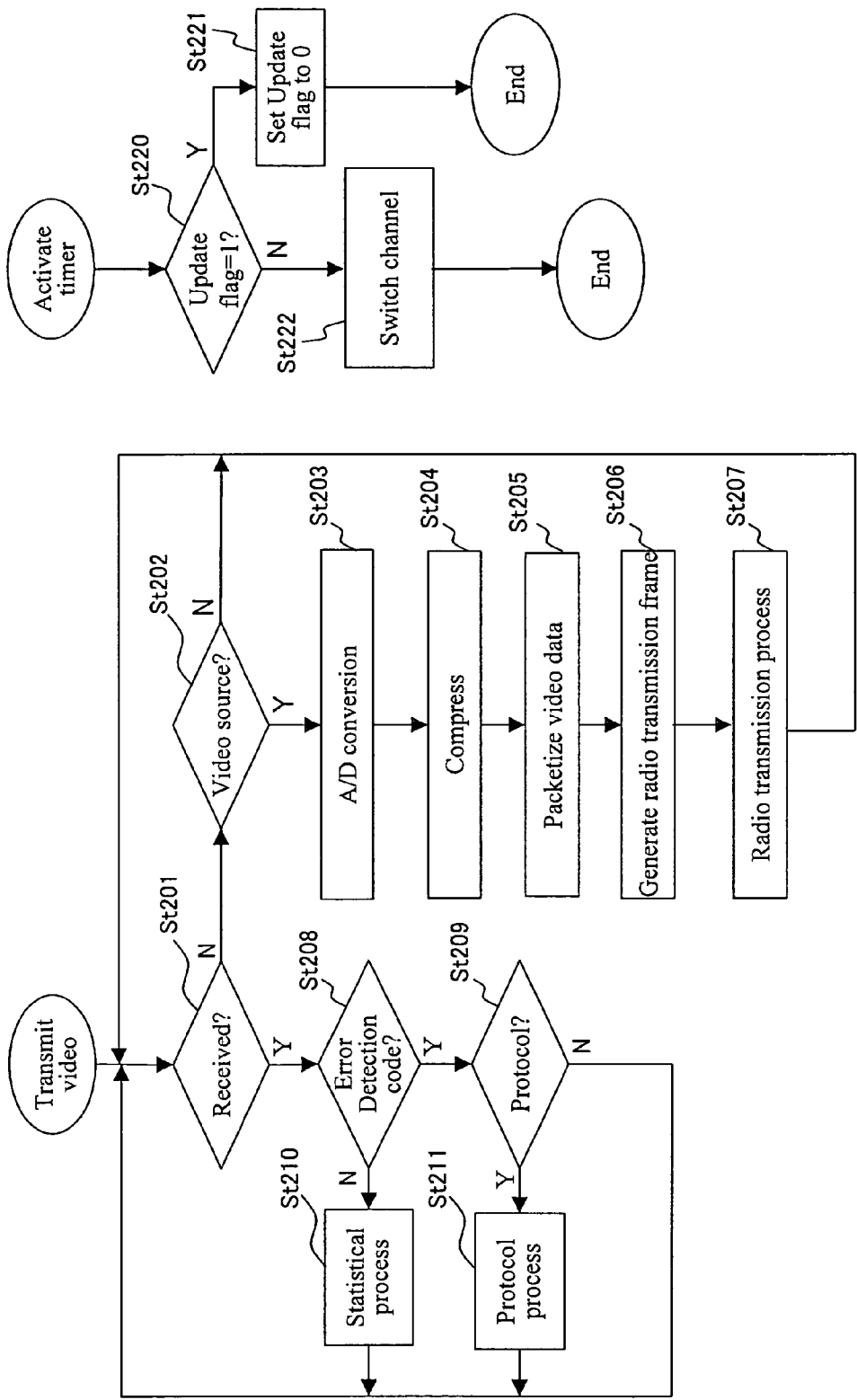
FIG. 13 is a flowchart of a procedure of video transmission executed by the transmitter for video transmission according to the present embodiment.

With reference to FIGS. 3 and 13, description will be given of the video-related process in which the transmitter 10 transmits the video source after the connection procedure shown in FIGS. 8 to 12.

In the present description, the compression system MPEG2-TS and a compression rate of 6 Mbps are set for the compression processing means 105 of the transmitter 10 as initial values to allow the video source to be compressed.

FIG. 13 is a flowchart of a video transmission procedure executed by the transmitter for video transmission.

In FIG. 13, the transmitter 10 executes a process of waiting for the radio transmission frame 300 (see FIG. 4) from the receiver 20 to reach the transmitter 10 as described later (step St201). If the transmitter 10 has not received the radio transmission frame 300 from the receiver 20, it executes a process of inputting, to itself, an NTSC analog video signal from the AV equipment 50 connected to itself (step St202).

If during the input process in step St202, the NTSC analog video signal from the AV equipment 50 connected to the transmitter 10 is input to the transmitter 10, the transmitter 10 uses the digital processing means 106 to convert the NTSC analog video signal into digital video data (step St203).

The compression processing means 105 compresses the digital video data into MPEG2-TS data at the rate of 6 Mbps (step St204). The MPEG2-TS data is further converted into compressed digital video data 340D (see FIG. 6) to which a predetermined size of MPEG2-TS data and a sequence number are added (step St205).

The transmission frame processing means 102 converts the compressed digital video data 340D into such a radio transmission frame 300 as shown in FIG. 4 by adding a destination ID 310, a source ID 320, a content type 330, and an error detection code 350 to the compressed digital video data 340D (step St206).

The radio communication processing means 101 subjects the radio transmission frame 300 resulting from the compressed digital video data 340D to spectral spreading and then transmits the resulting data (step St207).

The series of processes shown in steps St202 to St207 are repeated to transmit the video source from the transmitter 10 to the receiver 20.

Now, with reference to FIGS. 7 to 14, description will be given of the "video transmission procedure" in which the receiver 20 receives and displays the video source after the connection procedure shown in FIGS. 8 to 12.

In the present description, the reception status analyzing means 208 of the receiver 20 is assumed to be provided with initial values by clearing the value of an error count retaining the number of erroneous radio transmission frames received (the number of radio transmission frames having failed to be accurately received) and the value of a reception count retaining the number of radio transmission frames received.

Figure 14:
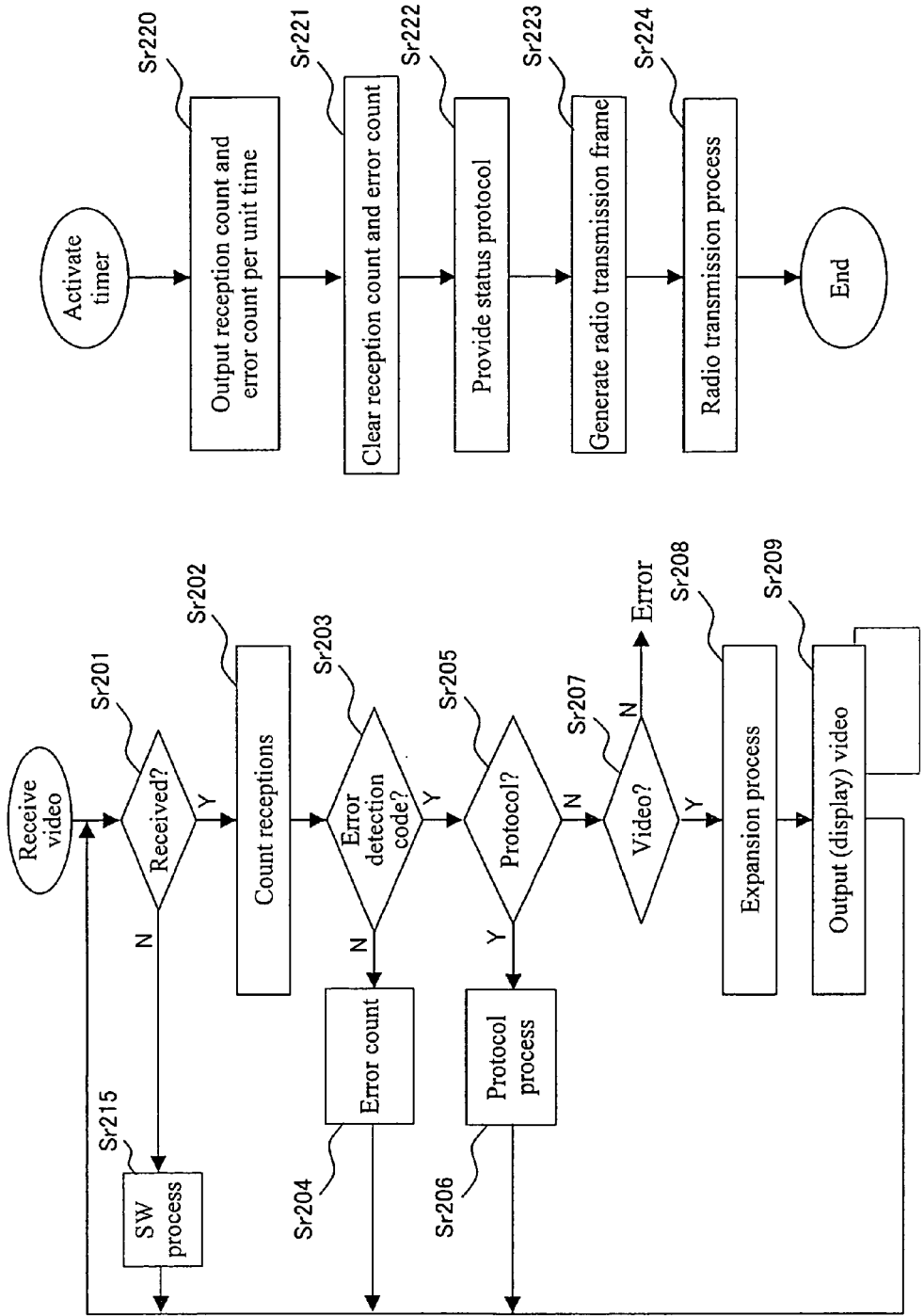
FIG. 14 is a flowchart of a procedure of video transmission executed by the receiver for video transmission according to the present embodiment.

FIG. 14 is a flowchart of a video transmission procedure executed by the receiver for video transmission.

In FIG. 14, the receiver 20 uses the radio communication processing means 201 to execute a process of waiting for the radio transmission frame 300 (see FIG. 4) to reach the receiver 20 (step Sr201). When the radio communication processing means 201 receives the radio transmission frame 300, the reception status analyzing means 208 adds one to the reception count (step Sr202).

Then, the receiver 20 calculates the error detection code in the received radio transmission frame 300 (step Sr203). If the calculated error detection code is the same as the added error detection code 350, the procedure advances to a process of determining the type 330 of contents of the data 340 in the radio transmission frame 300 as shown in step Sr205.

In contrast, if the calculated error detection code is different from the added error detection code 350, the receiver 20 determines the radio transmission frame 300 to be erroneous. The reception status analyzing means 208 adds 1 to the error count (step Sr204).

If the receiver 20 determines in step Sr203 that the error detection code 340 is the same as the error detection code 350, it uses the reception frame processing means 203 to execute a process of determining the type of contents of the data 340 from the received radio transmission frame 300, that is, determining whether the data 340 is the protocol message 340P (see FIG. 5) or the compressed digital video data 340D (see FIG. 6) (step Sr205).

If the receiver 20 determines in step Sr205 that the received radio transmission frame 300 is the protocol message 340P, the protocol processing means 204 executes a protocol process corresponding to the protocol message 340P (step Sr206). Description will be given below of the contents of the protocol process executed by the receiver 20.

On the other hand, if the received radio transmission frame 300 is not the protocol message 340P, the receiver 20 checks the video type of the video data 340D, that is, checks whether the compression system set for the expansion processing means 205 is MPEG2-TS (step Sr207). In this case, MPEG2-TS is preset for the expansion processing means 205 of the receiver 20.

Accordingly, on the basis of the video type 341D of the received compressed digital video data 340D, the expansion processing means 205 decodes the compressed digital video data 342D to execute a expansion process corresponding to the MPEG2-TS compression system (step Sr208). This converts the compressed digital video data 340D into the original digital video data.

Then, the analog processing means 206 converts the resulting digital video data into an NTSC analog video signal. The video display means 207 displays the resultant video signal as video (step Sr209).

The above series of processes reproduce the video source transmitted by the transmitter 10 as video on the receiver 20.

[Protocol-Related Process]

Now, with reference to the drawings, description will be given of a protocol-related process in the "video transmission procedure" which is executed by the transmitter 10 and receiver 20 transmitting video as described above.

A process executed by the receiver 20 will be first described with reference to FIGS. 7, 14, 15, and 16.

After the connection procedure process shown in FIG. 10, the receiver 20 receives a video source or the like transmitted by the transmitter 10 as described in steps Sr201 to Sr209 in FIG. 14. On the other hand, the channel switching SW means 212, the rate switching SW means 213, and the equipment control SW means 215 execute a SW process on the basis of user operations (FIG. 14, step Sr215).

Figure 15:
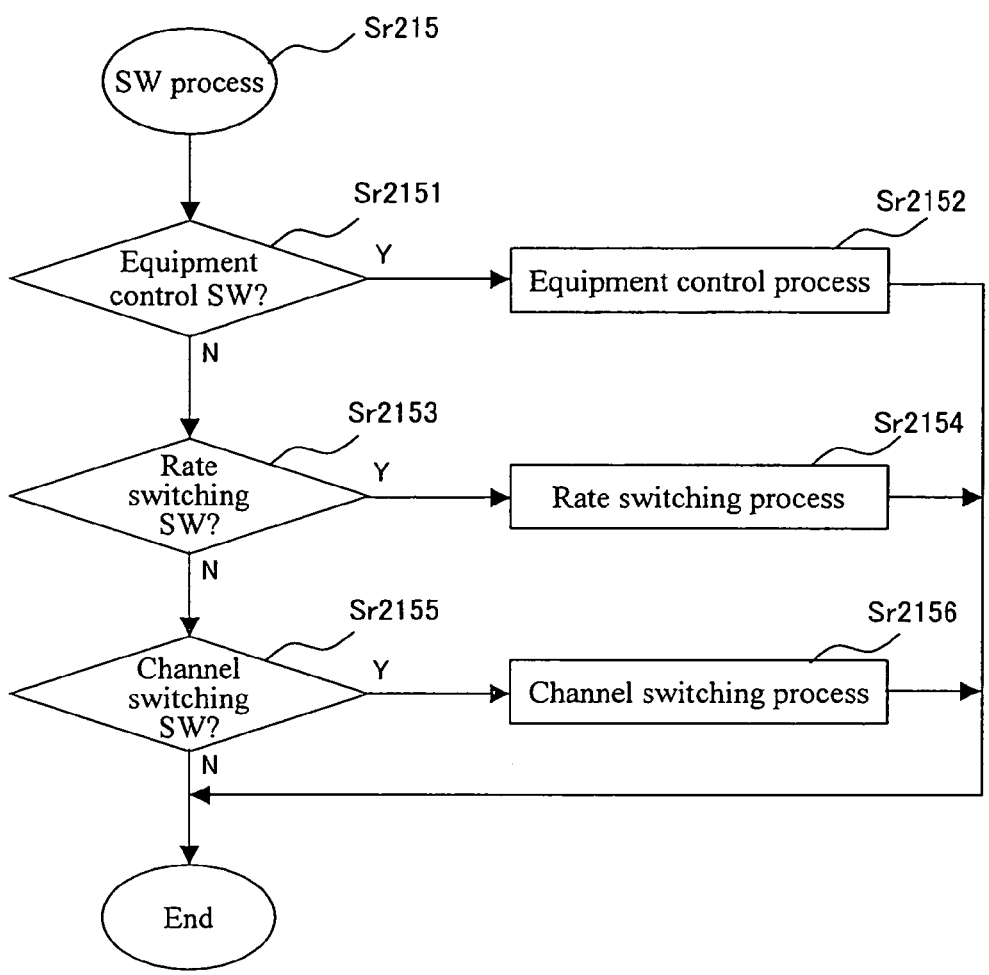
FIG. 15 is a flowchart of an SW process executed by the receiver according to the present embodiment.

FIG. 15 is a flowchart of a SW process executed by the receiver.

In FIG. 15, if the user uses the channel switching SW means 212 to perform a channel switching operation (step Sr2155), the channel switching processing means 209 of the receiver 20 receives an instruction on channel switching from the channel switching SW means 212. The channel switching processing means 209 outputs the value for a target channel to the radio communication processing means 201 (step Sr2156). Here, the channel switching processing means 209 outputs the value for one of the channels P, Q, and R.

Thus, the radio communication processing means 201 uses the channel value input by the channel switching processing means 209, in place of the currently set channel value, to communicate the radio transmission frame 300 (see FIG. 4) by radio on the basis of the spectrum spread communication.

Further, if the user uses the rate switching SW means 213 to perform an operation of switching the transmission rate (step Sr2153), the rate switching processing means 210 of the receiver 20 receives the instruction on rate switching from the rate switching SW means 213. The rate switching processing means 210 then outputs the switching value for the transmission rate to the protocol processing means 204. Then, the protocol processing means 204 generates a rate switching message 340P (see FIG. 5) for the rate switching value. The transmission frame processing means 202 assembles the radio transmission frame 300 (see FIG. 4). The radio communication processing means 201 then transmits the assembled radio transmission frame 300 (step Sr2154). The expansion processing means 205 is also supplied with the switching value for the transmission rate output by the rate switching processing means 210. Consequently, the expansion rate for the expansion processing means 205 is also changed.

If the user uses the equipment control SW means 215 to perform an equipment control operation such as playing, stopping, pausing, or the like of the video source (step Sr2151), the equipment control processing means 214 of the receiver 20 receives an instruction on equipment control from the equipment control SW means 215 to output equipment control data to the protocol processing means 204. The protocol processing means 204 generates an equipment control message 340P (see FIG. 5) for the equipment control data. The transmission frame processing means 202 assembles the radio transmission frame 300 (see FIG. 4) and transmits the assembled radio transmission frame 300 to the radio communication processing means 201 (step Sr2152).

If the received radio transmission frame 300 is the protocol-message 340P, the protocol processing means 204 of the receiver 20 executes the protocol process shown in step Sr206 in FIG. 14.

Figure 16:
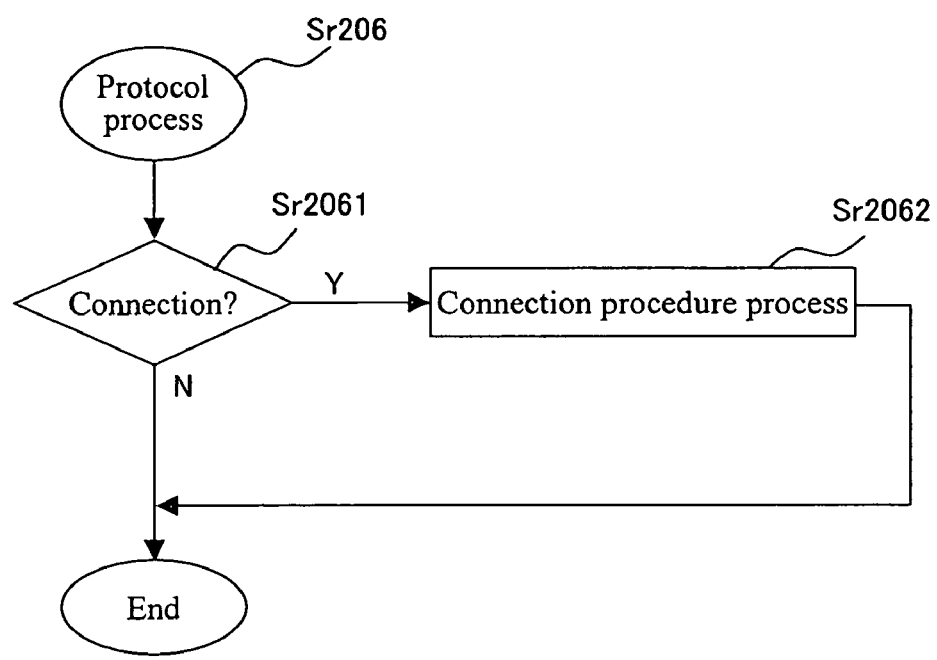
FIG. 16 is a flowchart of a protocol process executed by the receiver according to the present embodiment.

FIG. 16 is a flowchart of a protocol process executed by the receiver.

In FIG. 16, if the receiver 20 receives the protocol message 340P, it determines whether or not the protocol message 340P is a connection message (step Sr2061). If the protocol message 340P is a connection message, the receiver 20 executes the connection procedure process shown in FIG. 10 (step Sr2062).

That is, in this case, if the connection message is a connection request, the receiver 10 finishes the connection procedure process as shown in step Sr105 in FIG. 10.

Moreover, the receiver 20 is activated by the timer 217 to execute a process of periodically transmitting the reception status of the receiver 20 in the status message 340P (see FIG. 5), in addition to the process executed in response to the operation of the SW means 212, 213, or 215 as well as the protocol process.

A detailed description will be given below of the transmission of the reception status by the receiver 20 based on the timer activation.

Now, with reference to FIGS. 3, 13, and 17, description will be given of a protocol-related process in the "video transmission procedure" executed by the transmitter 10 in association with the above process executed by the receiver 20 during video transmission.

After the connection procedure process shown in FIG. 9, the transmitter 10 transmits a video source as described in steps St202 to St207 in FIG. 13, while executing a process of receiving the radio transmission frame 300 transmitted by the receiver 20.

That is, the transmitter 10 executes the reception waiting process shown in step St201 in FIG. 13. If the transmitter 10 detects reception of the radio transmission frame 300 (see FIG. 4) from the receiver 20, it calculates the error detection code in the received radio transmission frame 300 (step St208). If the calculated error detection code is the same as the added error detection code 350, the procedure advances to a process of determining the type 330 of contents of the data 340 in the radio transmission frame 300 as shown in step St209.

In contrast, if the calculated error detection code is different from the added error detection code 350, the transmitter 10 determines the radio transmission frame 300 to be erroneous. The transmitter 10 thus executes a statistic process (step St210).

If the transmitter 10 determines in step Sr208 that the error detection code 340 is the same as the error detection code 350, it uses the reception frame processing means 203 to execute a process of determining the type 330 of contents of the data 340 in the received radio transmission frame 300, that is, determining whether or not the data 340 is the protocol message 340P (see FIG. 5) (step St209).

If the transmitter 10 determines in step St209 that the received radio transmission frame 300 is the protocol message 340P, the protocol processing means 104 executes a protocol process (step St211).

On the other hand, if the received radio transmission frame 300 is not the protocol message 340P, the transmitter 10 returns to the reception waiting process shown in step St201.

Now, description will be given of the protocol process executed by the transmitter 10 and shown in step St211.

Figure 17:
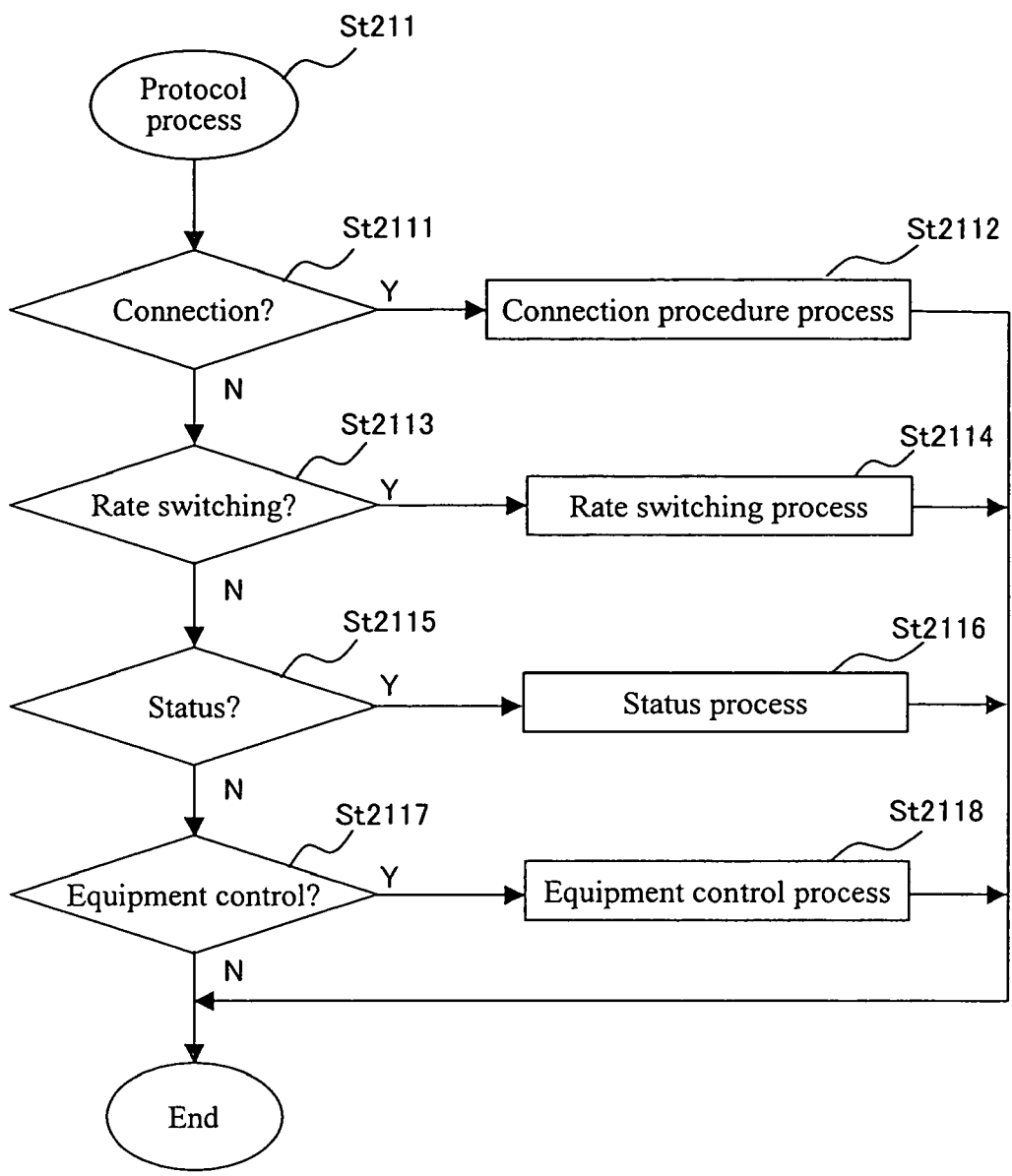
FIG. 17 is a flowchart of a protocol process executed by the transmitter according to the present embodiment.

FIG. 17 is a flowchart of a protocol process executed by the transmitter.

If the protocol processing means 104 determines that the protocol message 340P extracted by the reception frame processing means 103 is a rate switching message (step St2113), the transmitter 10 uses the rate switching processing means 107 to execute a process of switching the rate (step St2114).

Similarly, if the protocol processing means 104 determines that the protocol message 340P is a status message (step St2115), the transmitter 10 uses the status processing means 108 to execute a status process (step St2116).

Likewise, if the protocol processing means 104 determines that the protocol message 340P is an equipment control message (step St2117), the transmitter 10 uses the equipment control processing means 110 to execute an equipment control process (step St2118).

Similarly, if the protocol processing means 104 determines that the protocol message 340P is a connection message associated with the connection procedure process (step St2111), the transmitter 10 executes the connection procedure process shown in FIG. 9. That is, in this case, if the connection message is a connection request, the transmitter 10 executes a process of transmitting a connection response as shown in step St105 in FIG. 9.

Now, individual processes of the protocol-related process will be described with reference to specific examples.

[Rate Switching Process]

First, the rate switching process will be described.

Description will be given of the case in which the user using the receiver 20 to view and listen to video data determines that the radio environment has been degraded on the basis of a value displayed on the display means 216, to switch the compression rate (current value is 6 Mbps) for the video source.

For example, in the description below, the value (ratio of the error count to the reception count) for the reception status displayed on the reception status display means 216 is only 70% of the value for the appropriate reception status. The user thus uses the rate switching SW means 213 to perform an operation of switching the rate to 4 Mbps.

With reference to FIGS. 7, 14, and 15, description will be given of a protocol-related process executed by the receiver 20 in this case.

In FIG. 7, the rate switching value (4 Mbps) is output to the rate switching processing means 210 (FIGS. 14 and 15, steps Sr215 and Sr2153); the rate switching value is output by the rate switching SW means 213 in response to the user's operation.

The rate switching processing means 210 outputs '0' indicating the rate switching value (4 Mbps) to the protocol processing means 204.

The protocol processing means 204 uses the output value '0' as rate switching message data 342P to assemble a protocol message 340P (see FIG. 5) with a message ID 341P with a value of '1'. The protocol processing means 204 outputs the protocol message 340P to the transmission frame processing means 202.

The radio communication processing means 201 transmits the assembled protocol message via the transmission frame processing means 202 (FIGS. 14 and 15, steps Sr215 and Sr2154).

Now, with reference to FIGS. 3, 13, and 17, description will be given of a protocol-related process executed by the receiver 10 having received the rate switching message.

The receiver 10 receives the radio transmission frame 340 consisting of the rate switching message from the radio communication processing means 101. When the rate switching message is supplied to the protocol processing means 104 via the reception frame processing means 103 (FIG. 13, steps St201, St208, and St209), the protocol processing means 104 outputs the data '0' to the rate switching processing means 107 because the message ID has a value of '1' (FIGS. 13 and 17, steps St211 and St2113).

The rate switching processing means 107 outputs the rate switching value (4 Mbps) indicated by the data '0' to the compression processing means 105 as a compression value (compression rate) for a compression process (FIGS. 13 and 17, steps St211 and St2114).

The compression processing means 105 uses the compression rate of 4 Mbps to compress digital video data in a video source output by the digital processing means 106, into MPEG2-TS compressed digital video data (FIG. 13, step St204).

As described above, the user's operation of the receiver 20 switches the compression rate for the compressed digital video data transmitted by radio.

[Equipment Control Process]

Now, the equipment control process will be described.

In the description below, the user viewing and listening to a video source transmitted by the transmitter 10 operates the equipment control SW means 215 to for example, play, stop, or pause the video source.

In the present embodiment, the equipment control SW means 215 outputs the equipment control data described below.

"Play" is equipment control data that operates a stopped or paused video source.

"Stop" is equipment control data that stops transmission of the video source.

"Pause" is equipment control data that pauses the transmission of the video source.

In the example described below, the user operates the "play" switch.

With reference to FIGS. 7, 14, and 15, description will be given of a protocol-related process executed by the receiver 20 in this case.

In response to the user's operation, the equipment control SW means 215 outputs "play" to the equipment control processing means 214 (FIGS. 14 and 14, steps Sr215 and Sr2151).

The equipment control processing means 204 outputs the equipment control data '0' indicating "play" to the protocol processing means 204.

The protocol processing means 204 uses the output equipment control data '0' as equipment control message data 342P to assemble a protocol message 340P (see FIG. 5) with a message ID 341P with a value of '3'. The protocol processing means 204 outputs the protocol message 340P to the transmission frame processing means 202.

The radio communication processing means 201 transmits the protocol message via the transmission frame processing means 202 (FIGS. 14 and 15, steps Sr215 and Sr2152).

Now, with reference to FIGS. 3, 13, and 17, description will be given of a protocol-related process executed by the transmitter 10 having received the equipment control message.

Upon reception of the equipment control message (FIG. 13, steps St201, St208, and St209), the transmitter 10 outputs the equipment control message data '0' to the equipment control processing means 110 (FIGS. 13 and 17, steps St211 and St2117).

The equipment control processing means 110 converts the equipment control "play" indicated by the data '0' into an infrared remote control signal corresponding to "play" of the AV equipment 50, serving as equipment that outputs a video source not shown in the drawings (FIGS. 13 and 17, steps St211 and St2118).

The AV equipment 50, serving as video source output equipment, receives and processes the infrared remote control signal. In this case, the AV equipment 50 executes a play process.

As described above, the user's operation of the receiver 20 makes it possible to control the compressed digital video data transmitted by radio.

[Status Process]

Description will be given of the status process in which the status information on the receiver 20 is periodically transmitted to the transmitter 10 after the connection procedure process described with reference to FIGS. 9 and 10.

First, a process related to the receiver 20 will be described with reference to FIGS. 7 and 14.

In accordance with an instruction from the periodically activated timer 217, the reception status analyzing means 208 of the receiver 20 calculates the ratio of the error count to the reception count from the values of the reception count and error count based on the process shown in steps Sr202 and Sr204 in FIG. 14. The receiver 20 then outputs the ratio to the reception status display means 216 and status processing means 211 (step Sr220). Subsequently, the reception status analyzing means 208 clears the values for the reception count and error count to provide for the next reception and error counts (step Sr221).

Then, the status processing means 211 outputs the value for the reception status (ratio of the error count to the reception count) to the protocol processing means 204 as data. The protocol processing means 204 assigns the reception status to the data 342P in the protocol message 340P (see FIG. 5) to generate a status message with a message ID 342P with a value of '2' (step Sr222). The protocol processing means 204 transmits the status message to the transmission frame processing means 202. The transmission frame processing means 202 then converts the status message into a radio transmission frame 300 (see FIG. 4) (step Sr223).

Then, the receiver 20 finally uses the radio communication processing means 201 to subject the radio transmission frame 300 to spectral spread. The receiver 20 then transmits the resulting data to the transmitter 10 (step Sr224).

Further, the reception status display means 216 displays the reception status (ratio of the error count to the reception count) to the user so that it overlaps a LED display or the video source.

Now, with reference to FIGS. 3, 13, and 17, description will be given of a protocol-related process executed by the transmitter 10 after receiving the status message.

In FIG. 13, the transmitter 10 performs the operations described below using the radio communication processing means 101, reception frame processing means 103, and protocol processing means 104, shown in FIG. 2. The transmitter 10 executes a process of waiting for the radio transmission frame 300 to reach the transmitter 10 (step St201). If the radio transmission frame 300 has been received, the transmitter 10 checks the error code (step St208). After checking the error code, the transmitter 10 analyzes the radio transmission frame. If the radio transmission frame is a protocol message (step St209), the transmitter 10 executes a process corresponding to the contents of the protocol message (step St211).

In FIG. 17, the transmitter 10 uses the protocol processing means 104 to analyze the protocol message 340P. If the protocol message 340P is a status message (step St2115), the status processing means 108 extracts and holds the reception status (ratio of the error count to the reception count) of the receiver 20 from the status message. The status processing means 108 sets and updates an internal update flag to '1' (step St2116).

In FIG. 13, the status processing means 108 uses the timer 111 to periodically check whether or not the update flag is '1' (step St220). If the update flag is '1', this indicates that the receiver 20 periodically updates the reception status. The status processing means 108 thus sets and updates the update flag to '0' (step St221).

Accordingly, if the update flag is determined to be '0' during the check, this indicates that the process shown in step St2116 in FIG. 13 has not been executed with the reception status not updated yet; the update of the reception status is based on the status message from the receiver 20. Accordingly, the status processing means 108 outputs an instruction on channel switching to the channel switching processing means 109 (step St222).

As described above, the transmitter 10 can retain the status message for its own reception status (ratio of the error count to the reception count) periodically transmitted by the receiver 20, while periodically updating the status message as required. The periodic reception status is utilized for the channel switching process shown below.

[Channel Switching Process]

Description will be given of the case in which the transmitter 10 and the receiver 20 switch the channel after the connection procedure process described in FIGS. 9 and 10.

First, a process related to the receiver 20 will be described with reference to FIGS. 7, 14, and 15; in this example, the radio environment is appropriate and the user switches from channel P to channel Q.

In FIG. 7, when the user operates the channel switching SW means 212 of the receiver 20, an instruction on setting of the channel Q is output to the channel switching processing means 209 (FIGS. 14 and 15, steps Sr215 an Sr2155).

The channel switching processing means 209 instructs the protocol processing means 204 to stop the video transmission procedure and execute a connection procedure. The channel switching processing means 209 also instructs the radio communication processing means 201 to switch the current channel P to another channel Q.

Then, the receiver 20 executes the connection procedure shown in FIG. 10 again using the protocol processing means 204, radio communication processing means 201, transmission frame processing means 202, and reception frame processing means 203.

In this case, the connection procedure shown in FIG. 10 is executed with the substantially fixed channel Q; the channel Q is initialized in the "channel switching" operation shown in step Sr102 and after the time B elapses, the channel is switched to set the channel Q again as shown in step Sr101.

The corresponding process executed by the transmitter 10 will be described with reference to FIGS. 3, 13, and 17.

When the periodically activated status process, described in FIGS. 13 and 17, is executed to find that the receiver 20 does not periodically update the reception status using the channel P, the transmitter 10 determines that the receiver 20 has been switched from the channel P to a different channel. The transmitter 10 thus executes a channel switching process.

That is, in the transmitter 10, set for the channel P, before the receiver 20 is switched to the channel Q, if the status processing means 108 is activated by the timer 111 to check the update flag (step St220) as shown in FIG. 13, it determines the update flag to be set to '1'. Since this indicates that the receiver 20 updated the reception status during the activation by the timer 11, the status processing means 108 sets the update flag to '0' (step St221) to finish the series of processes.

However, the receiver 20 has been switched to the channel Q as described above. Consequently, the transmitter 10 cannot receive a status message from the receiver 20 and thus cannot execute the status process shown in step St2116 in FIG. 17. Therefore, the transmitter 10 cannot set or update the update flag to '1'.

As a result, the update flag remains set to '0', indicating that the receiver 20 has not updated its reception status. The transmitter 10 thus determines that the periodic transmission of a status message from receiver 20 has been discontinued. The transmitter 10 then executes a process of switching the channel (step St222).

Accordingly, the transmitter 10 instructs the radio communication processing means 101, transmission frame processing means 102, reception frame processing means 103, protocol processing means 104, and channel switching processing means 109 to stop the video-related process and execute a connection procedure. The transmitter 10 executes again the connection procedure shown in FIG. 9.

In the above process, the transmitter 10 executes a process of connecting to the receiver 20 through the channel Q. The transmitter 10 and the receiver 20 execute again a video transmission procedure including a video-related process using the new channel Q.

Now, description will be given of the case in which the transmitter 10 and the receiver 20 automatically switch the channel if the radio environment is degraded to the degree that the status message cannot be transmitted.

If the radio environment is degraded to the degree that the status message cannot be transmitted, the transmitter 10 cannot execute the status process shown in step St2116 in FIG. 17 as in the case in which the user switches the channel on the receiver 20 to discontinue the reception of the status message. Accordingly, the transmitter 10 stops the video-related process in operation and executes again the connection procedure shown in FIG. 9.

Thus, the transmitter 10 repeats a process of switching the channel until it is enabled to connect to the receiver 20, that is, until a new channel is encountered for which the receiver 20 has improved the radio environment or until the radio embodiment is improved again.

The user of the receiver 20 intentionally operates the channel switching SW means 212 to switch to a channel seemingly having an improved radio environment or tunas a power supply to the receiver 20 off and on again (that is, resets the receiver 20). Then, the user can view and listen to the video source over the new channel with the improved radio environment. In this case, instead of turning the power supply off and on again, the channel switching SW means 212 may be provided with a user operation section that allows the channel to be automatically switched as in the case of the power-on period.

The above series of processes enable radio video transmission to be carried out between the transmitter 10 and the receiver 20 by operating the receiver 20 to switch the channel between the transmitter 10 and the receiver 20, even if the radio environment is degraded to the degree that data cannot be transmitted.

Description has been given of the system and method for radio video transmission according to the present embodiment. Other embodiments of the present invention will be described. For the description, components that are the same as or similar to those in the above embodiment have the same reference numerals as those in the above embodiment. Their detailed description is omitted.

SECOND EMBODIMENT

Now, with reference to FIG. 18, description will be given of a second embodiment of a system and method for radio video transmission according to the present invention.

Figure 18:
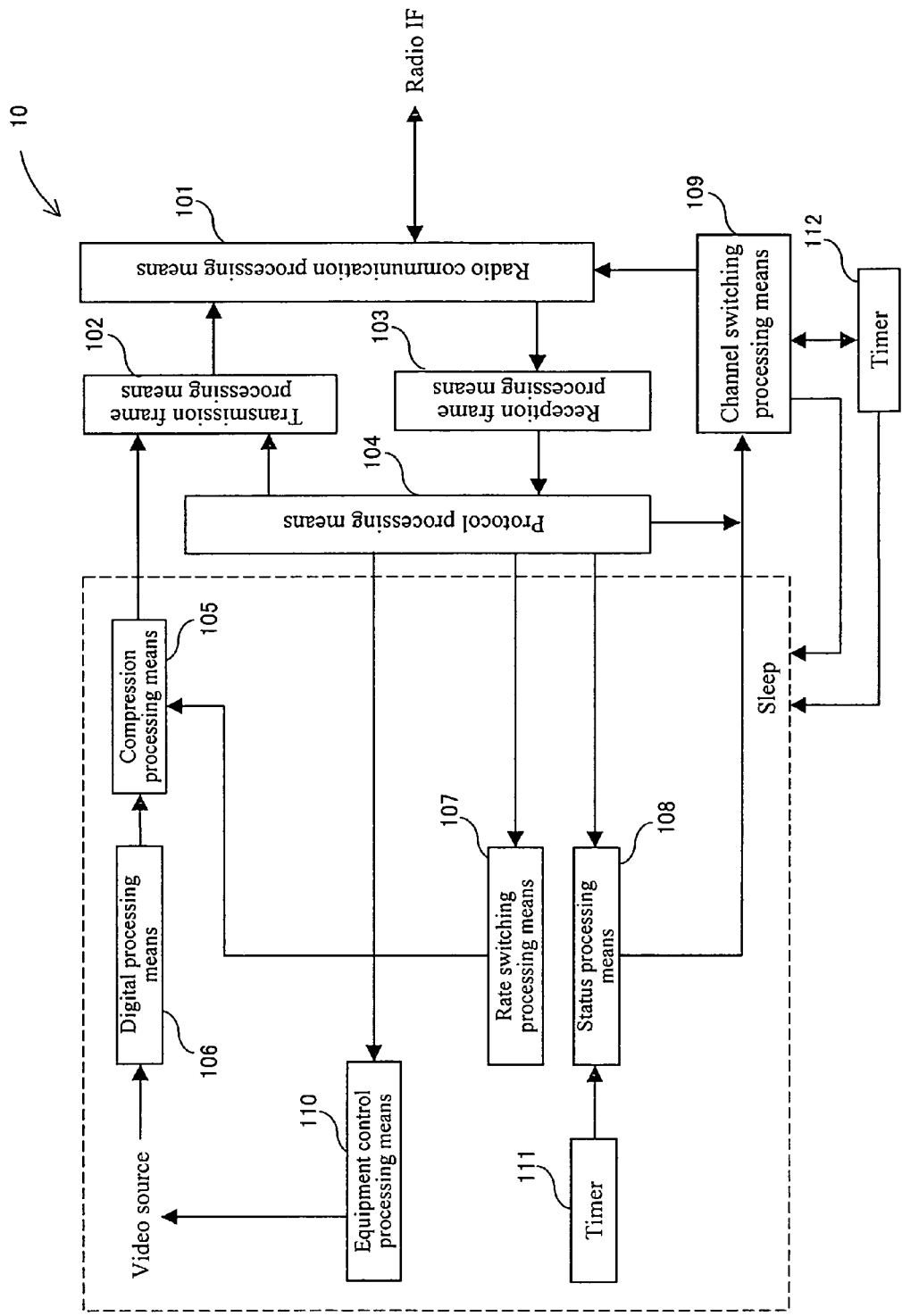
FIG. 18 is a diagram showing the configuration of a transmitter according to a second embodiment of the present invention.

FIG. 18 is a diagram showing the configuration of a transmitter according to the second embodiment.

The second embodiment corresponds to the first embodiment characterized in that a timer 112 is provided in the channel switching processing means 109 of the transmitter 10 and in that each of the processing means 105 to 108, 110, and 111 enclosed by a dotted line in FIG. 18 comprises a power saving mode function for stopping a supplied driving clock or a power supply.

When the periodic status message from the receiver 20 is discontinued and the transmitter 10 attempts to find an available channel for connection, the timer 112 counts the time spent in switching the channel.

Description will be given of the system and method for radio video transmission according to the present embodiment configured as described above.

In the transmitter 10, as in the case of the first embodiment, when the status processing means 108 detects that the periodic transmission of a status message from the receiver 20 has been discontinued (FIG. 13, step St220), the channel switching processing means 109 starts the series of connection procedure steps shown in FIG. 9 (FIG. 13, step St222). The transmitter 10 thus switches the channel.

On this occasion, the channel switching processing means 109 activates a counter in the timer 112 simultaneously with the start of the connection procedure. The timer 112 counts a preset specified time D (time D>(time A)*3). Once the time D elapses, the timer 112 instructs each of the processing means 105 to 108, 110, and 111 to enter the power saving mode. Each of the processing means 105 to 108, 110, and 111 instructed by the timer 112 to enter the power saving mode enters the power saving mode by for example, stopping a supplied driving clock or a power supply.

Description will be given of the case in which an available channel for connection is found while the timer D is clocking the specified time D.

A connection request from the receiver 20 is received in step St104 of the series of connection procedure steps shown in FIG. 9. The protocol processing means 104 executes the processing shown in step St2112 in FIG. 17 to finish the connection procedure. Then, the channel switching processing means 109 of the transmitter 10 stops activating the timer 112. The channel switching processing means 109 further instructs each of the processing means 105 to 108, 110, and 111 to recover from the power saving mode.

Thus, the transmitter 10, including the recovered processing means 105 to 108, 110, and 111, executes the video transmission procedure shown in FIG. 13 using a new channel as in the case of the first embodiment.

As described above, with the system and method for radio video transmission according to the present embodiment, if for example, the user turns off the power supply to the receiver 20 to stop viewing and listening to the video source, the transmitter 10 enters the power saving mode, in which only the series of connection procedure steps shown in FIG. 9 are executed; the transmitter 10 remains in the power saving mode until the user starts viewing and listening to the video source on the receiver 20 again.

THIRD EMBODIMENT

Now, with reference to FIG. 19, description will be given of a third embodiment of a system and method for radio video transmission according to the present embodiment.

Figure 19:
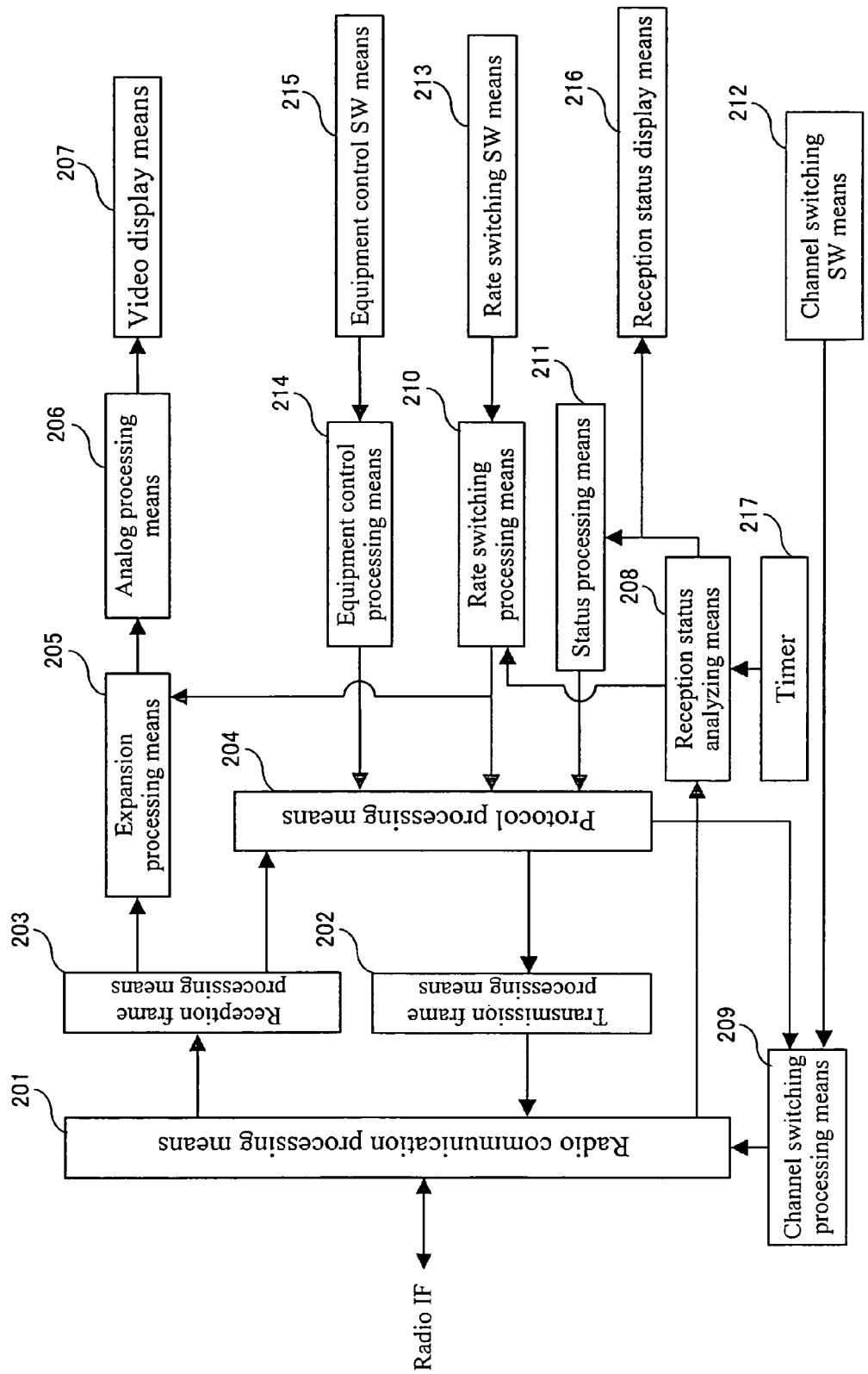
FIG. 19 is a diagram showing the configuration of a receiver according to a third embodiment of the present invention.

FIG. 19 is a diagram showing the configuration of a receiver according to the third embodiment.

In the third embodiment, the reception status analyzing means 208 of the receiver 20 according to the first embodiment, shown in FIG. 7, comprises a process of analyzing the reception status (ratio of the error count to the reception count) of the receiver 20 and instructing the rate switching processing means 210 to switch the rate.

According to the present embodiment, the reception status analyzing means 208 additionally has an automatic transmission rate adjusting function. With this function, for example, while video is being transmitted between the transmitter 10 and the receiver 20 at a transmission rate of 6 Mbps, when the reception status (ratio of the error count to the reception count) of the receiver 20 indicates 40 to 50%, an instruction is automatically output to the rate switching processing means 210, the instruction commanding the transmission rate to be switched and lowered to 4 Mbps.

Thus, if the radio environment is degraded, the rate switching processing means 210 outputs the rate switching value (4 Mbps) to the protocol processing means 204 and the expansion processing means 205.

As a result, the receiver 20 transmits a rate switching message to the transmitter 10, which then executes the rate switching process shown in step St2114 in FIG. 17 to switch the transmission rate to 4 Mbps.

As described above, with the system and method for radio video transmission according to the present embodiment, if the radio environment is degraded, the transmission rate can be lowered with the channel remaining unchanged. This enables radio video transmission to be accurately accomplished.

Although not described in the present embodiment, the automatic transmission rate adjusting function of the reception status analyzing means 208 can automatically output an instruction on an increase in transmission rate to the rate switching processing means 210 if the radio environment is changed for the better.

FOURTH EMBODIMENT

Now, with reference to FIG. 20, description will be given of a fourth embodiment of a system and method for radio video transmission according to the present invention.

Figure 20:
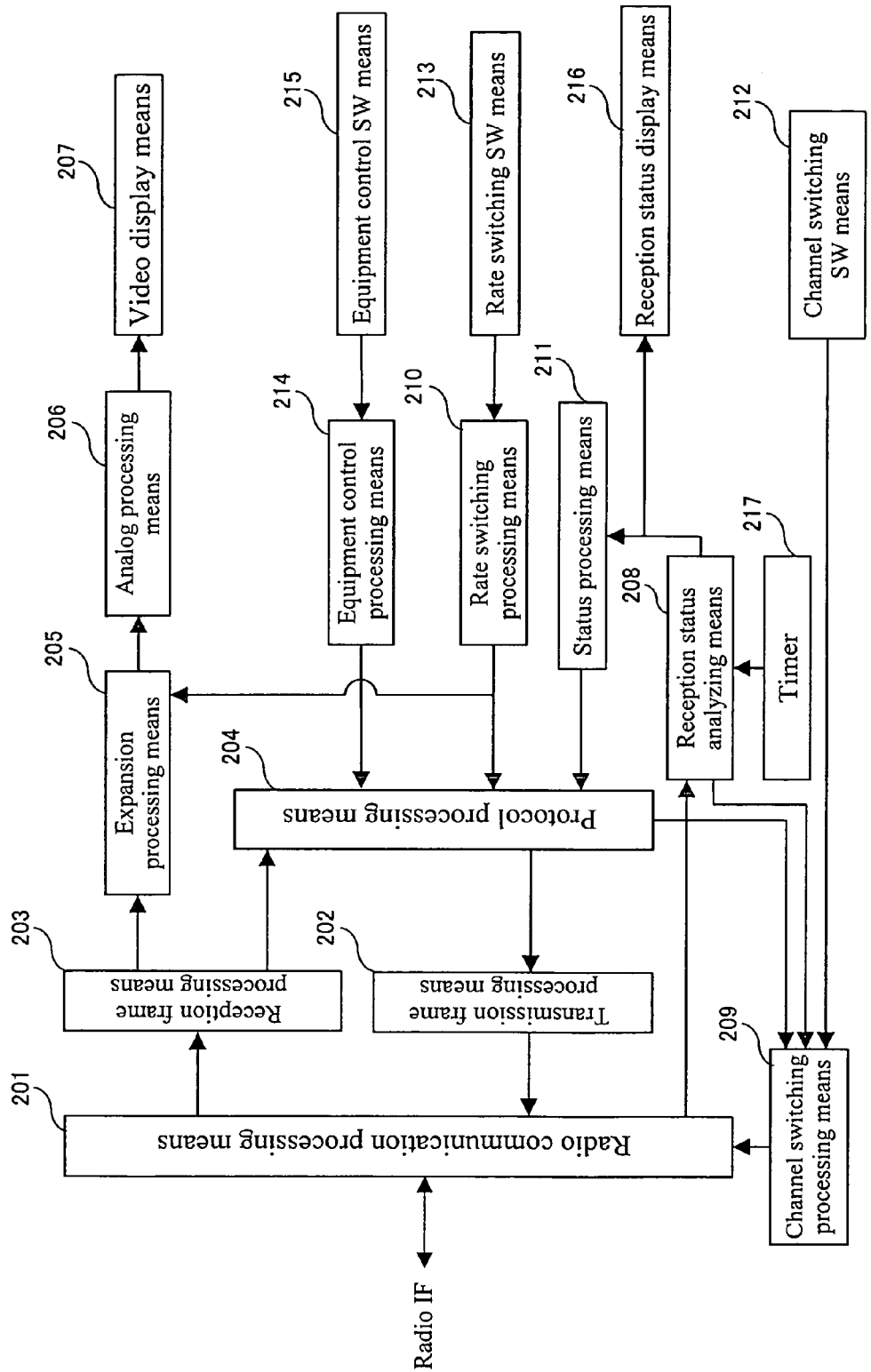
FIG. 20 is a diagram showing the configuration of a receiver according to a fourth embodiment of the present invention.

FIG. 20 is a diagram showing the configuration of a receiver according to the fourth embodiment.

In the fourth embodiment, the reception status analyzing means 208 of the receiver according to the first embodiment, shown in FIG. 7, comprises a process of analyzing the reception status (ratio of the error count to the reception count) of the receiver 20 and instructing the channel switching processing means 209 to switch the channel.

According to the present embodiment, the reception status analyzing means 208 additionally has an automatic channel adjusting function. With this function, for example, while video is being transmitted between the transmitter 10 and the receiver 20 using the channel P, when the reception status (ratio of the error count to the reception count) of the receiver 20 indicates at least 70%, an instruction is automatically output to the channel switching processing means 209, the instruction commanding the channel P to be switched.

Thus, if the radio environment is degraded, the channel switching processing means 209 outputs, to the radio communication processing means 201, the instruction commanding the current channel P to be switched to the different channel Q.

As a result, if the radio environment is degraded, the radio communication processing means 201 automatically executes a process of switching to the channel Q without waiting for the user to operate the channel switching SW means 212. The radio communication processing means 201 thus switches the reception channel of the receiver 20.

As described above, with the system and method for radio video transmission according to the present embodiment, even if the radio environment is degraded, the transmitter 10 and the receiver 20 can execute video transmission by automatically finding a channel with a relatively favorable radio environment while switching their channels. This enables accurate radio video transmission.

FIFTH EMBODIMENT

Now, with reference to FIGS. 19, 20, and 21, description will be given of a fifth embodiment of a system and method for radio video transmission according to the present invention.

In the fifth embodiment, the reception status analyzing means 208 of the receiver according to the first embodiment, shown in FIG. 7, analyzes the reception status (ratio of the error count to the reception count) of the receiver 20 and comprises both the automatic transmission rate adjusting function according to the third embodiment described with reference to FIG. 19 and the automatic channel adjusting function according to the fourth embodiment described with reference to FIG. 20.

Accordingly, the reception status analyzing means 208 of the receiver 20 analyzes the reception status (error rate=the error count/reception count) of the receiver 20 to instruct the rate switching processing means 210 to switch the transmission rate or instruct the channel switching processing means 209 to switch the channel, according to the value of the error rate.

Figure 21:
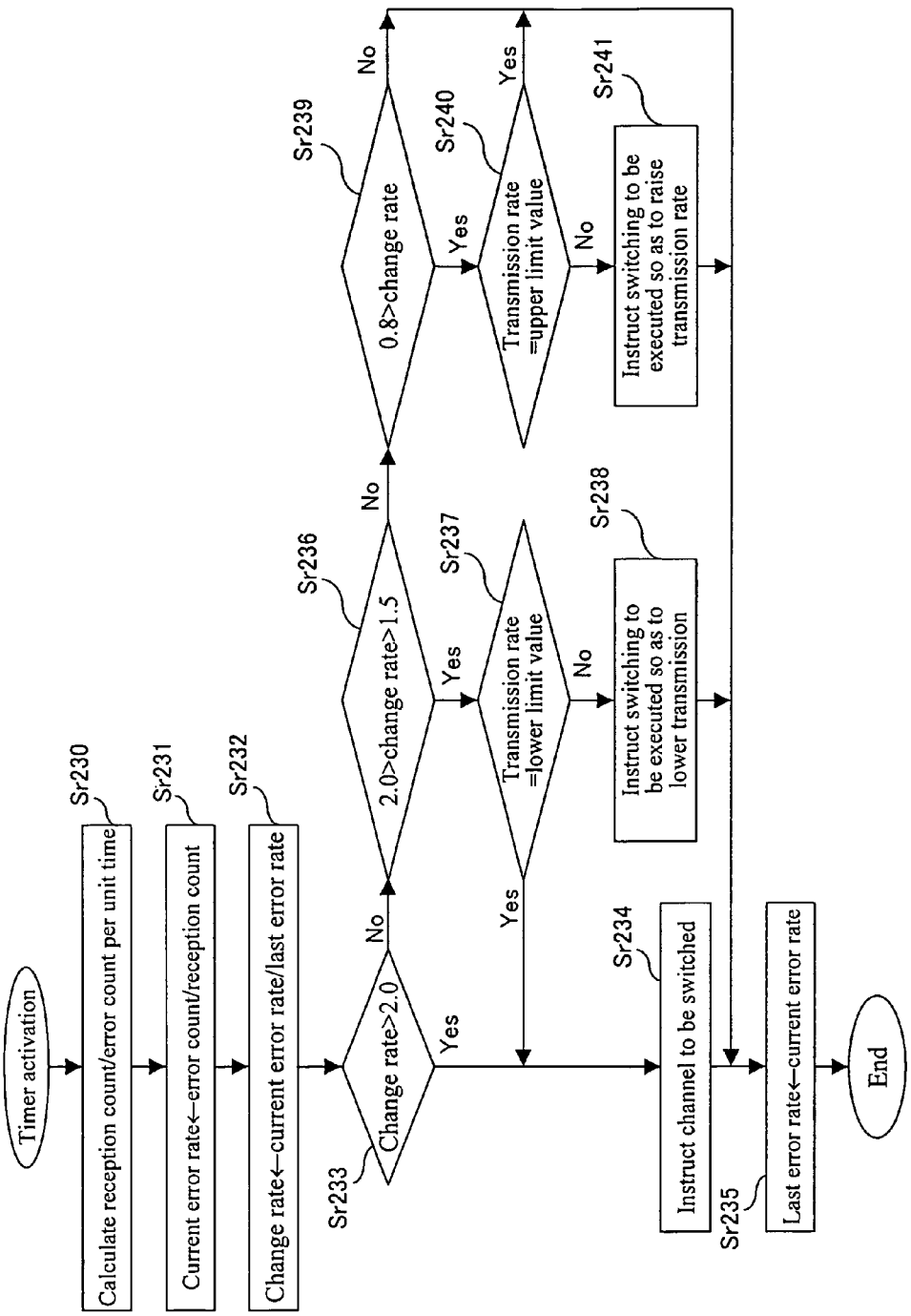
FIG. 21 is a flowchart of an automatic transmission rate/channel adjustment function executed by reception status analyzing means according to a fifth embodiment of the present invention.

FIG. 21 is a flowchart of the automatic transmission rate/channel adjusting function executed by the reception status analyzing means according to the present embodiment.

The automatic transmission rate/channel adjusting function executed by the reception status analyzing means 208 is activated in synchronism with the series of processes shown in steps Sr220 to Sr224 in FIG. 14 on the basis of periodic timing outputs from the timer 217.

In FIG. 21, in response to an instruction from the periodically activated timer 217, the reception status analyzing means 208 calculates the ratio of the error count to the reception count (error rate) per unit time (step Sr230). The reception status analyzing means 208 retains the calculated error rate as the current error rate (step Sr231).

Then, the reception status analyzing means 208 calculates the ratio of the last error rate calculated and retained as the current error rate during the last activation by the timer 217 to the current error rate calculated and retained in steps Sr230 and Sr231 (step Sr232). The reception status analyzing means 208 thus calculates a change rate.

Then, the reception status analyzing means 208 determines whether or not the change rate is larger than, for example, '2.0' (step Sr233), whether or not the change rate is between '2.0' and '1.5' (step Sr236), or whether or not the change rate is smaller than '0.8' (step Sr239), and performs the adjust according to the result.

In the present embodiment, if the reception status analyzing means 208 determines in step Sr233 that the change rate is larger than '2.0', the reception status analyzing means 208 outputs an instruction on channel switching to the channel switching processing means 209 (step Sr234).

On the other hand, if the reception status analyzing means 208 determines in step Sr236 that the change rate is between '2.0' and '1.5' the reception status analyzing means 208 further compares the current transmission rate with its lower limit value (in this case, 4.0 Mbps) (step Sr237). If this comparison indicates that the transmission rate has already reached the lower limit value, the reception status analyzing means 208 outputs an instruction on channel switching to the channel switching processing means 209 (step Sr234). If the transmission rate has not reached the lower limit value, the reception status analyzing means 208 outputs an instruction on rate switching to the rate switching processing means 210, the instruction commanding the transmission rate to be lowered to the next smaller value (step Sr238).

If the reception status analyzing means 208 determines in step Sr239 that the change rate is smaller than '0.8', the reception status analyzing means 208 further compares the current transmission rate with its upper limit value (in this case, 6.0 Mbps) (step Sr240). If this comparison indicates that the transmission rate has already reached the upper limit value, the reception status analyzing means 208 does not adjust the channel or transmission rate. If the transmission rate has not reached the upper limit value, the reception status analyzing means 208 outputs an instruction on rate switching to the rate switching processing means 210, the instruction commanding the transmission rate to be raised to the next larger value (step Sr241).

If the change rate is determined to be at most '0.8' and at least '1.5', the reception status analyzing means 208 neither adjusts the channel nor transmission rate.

After the process of automatically adjusting the transmission rate or channel in association with the value of the change rate, the reception status analyzing means 208 updates and retains the current error rate calculated and retained during the last process in step Sr232, as the last error rate in order to provide for the next activation by the timer 217 (step Sr235).

As described above, the following process can be executed by the system and method for radio video transmission according to the present embodiment: for example, during video transmission through the channel P, the channel is switched if the change rate of the reception status (error rate=the error count/reception count) of the receiver 20 is at least 2 times and thus indicates a significant change. The transmission rate is switched if the change rate is between 1.5 times and 2 times and thus indicates an insignificant change. If the change is less than 80%, the transmission rate can be switched.

Thus, if the reception environment is degraded rapidly and greatly, this can be dealt with by switching the channel. If the reception environments is slightly degraded or improved, this can be dealt with by switching the transmission rate. Therefore, adequate and precise video transmission can be accomplished in association with the level of a change in reception environment.

SIXTH ENVIRONMENT

Figure 22:
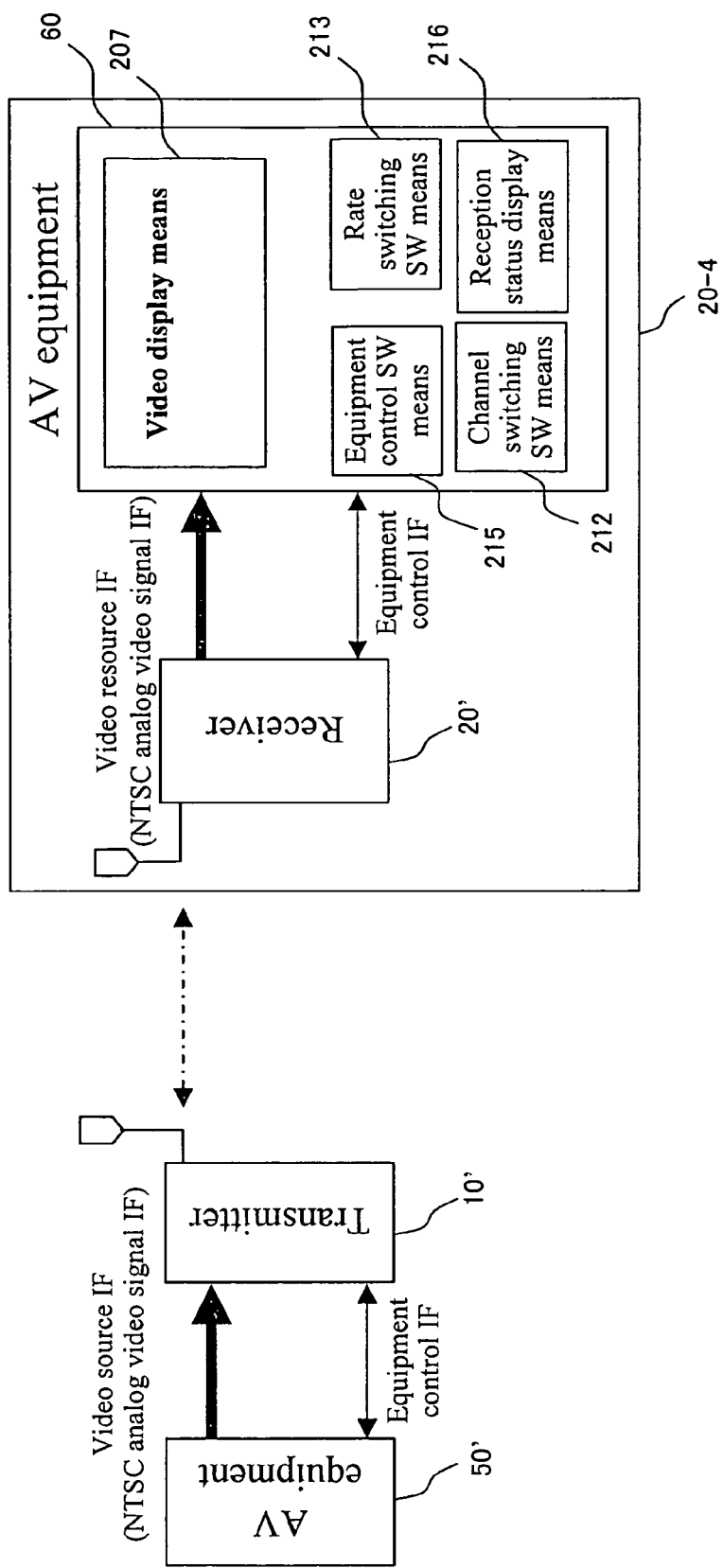
FIG. 22 is a diagram schematically illustrating equipment applied to a radio video transmission system according to a sixth embodiment of the present invention.

FIG. 22 is a diagram schematically illustrating equipment applied to a radio video transmission system according to the present embodiment.

A transmitter 10' is connected to AV equipment 50' such as a VTR, a TV tuner, or a DVD player. As an interface for video sources, the AV equipment 50' supplies NTSC analog video signals to the transmitter 10'. As an interface for equipment control, the transmitter 10' supplies the AV equipment 50' with remote control outputs corresponding to instructions on playing, stopping, pausing, and the like of a video source.

Unlike the receiver 20 according to the first embodiment, a receiver 20' is connected to AV equipment 60 such as a TV monitor or a projector which is different from the AV equipment 50', connected to the transmitter 10'. The AV equipment 60 comprises the video display means 207 such as a liquid crystal, a cathode-ray tube, or a projector mechanism which displays video sources, the equipment control SW means 215 for controlling the AV equipment 50' in the transmitter 10', the rate switching SW means 213 for switching the rate at which video sources are transmitted, the channel switching SW means 212 for switching the channel through which video sources are transmitted, and the reception status display means 216 for displaying the reception status.

Further, as an interface for video sources, the receiver 20' supplies NTSC analog video signals to the AV equipment 60. As an interface for equipment control, the AV equipment 60 supplies the receiver 20' with remote control outputs corresponding to instructions ordering the AV equipment 50' of the transmitter 10' to, for example, play, stop, or pause a video source.

Now, description will be given of the configuration of each of the transmitter 10' and receiver 20' according to the present embodiment. In the description, the same components as those of the transmitter 10 and receiver 20 in the first embodiment have the same reference numerals. Their description is omitted. The format of the radio transmission frame in the present embodiment is also the same as that described in the first embodiment with reference to FIGS. 4 to 6. Accordingly, its description is also omitted.

Figure 23:
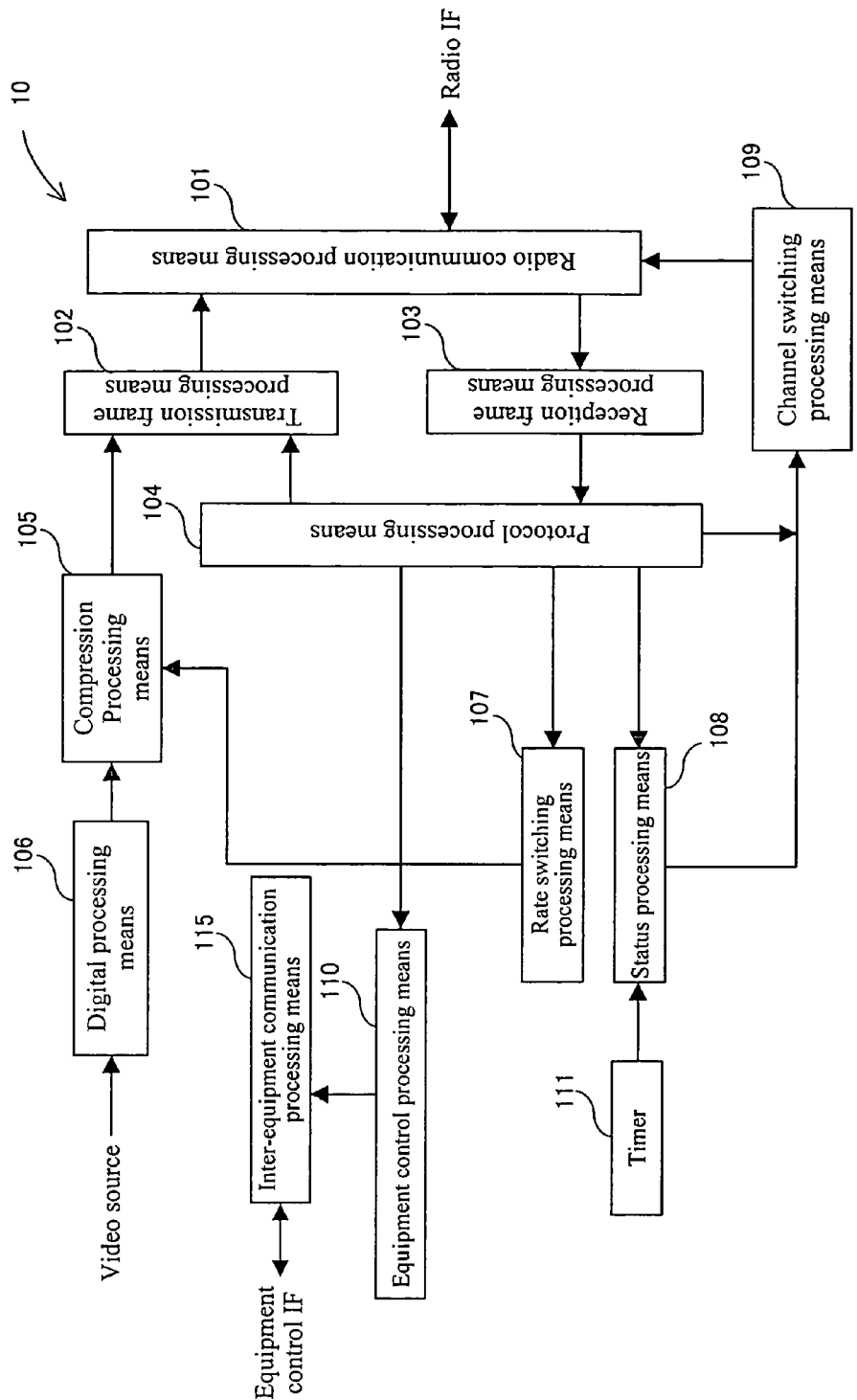
FIG. 23 is a diagram showing the configuration of a transmitter according to the sixth embodiment.

FIG. 23 is a diagram showing the configuration of the transmitter according to the present embodiment.

As shown in FIG. 23, the transmitter 10' according to the present embodiment differs from the transmitter 10 according to the first embodiment in that the inter-equipment communication processing means 115 is connected to the equipment control processing means 110.

Figure 24:
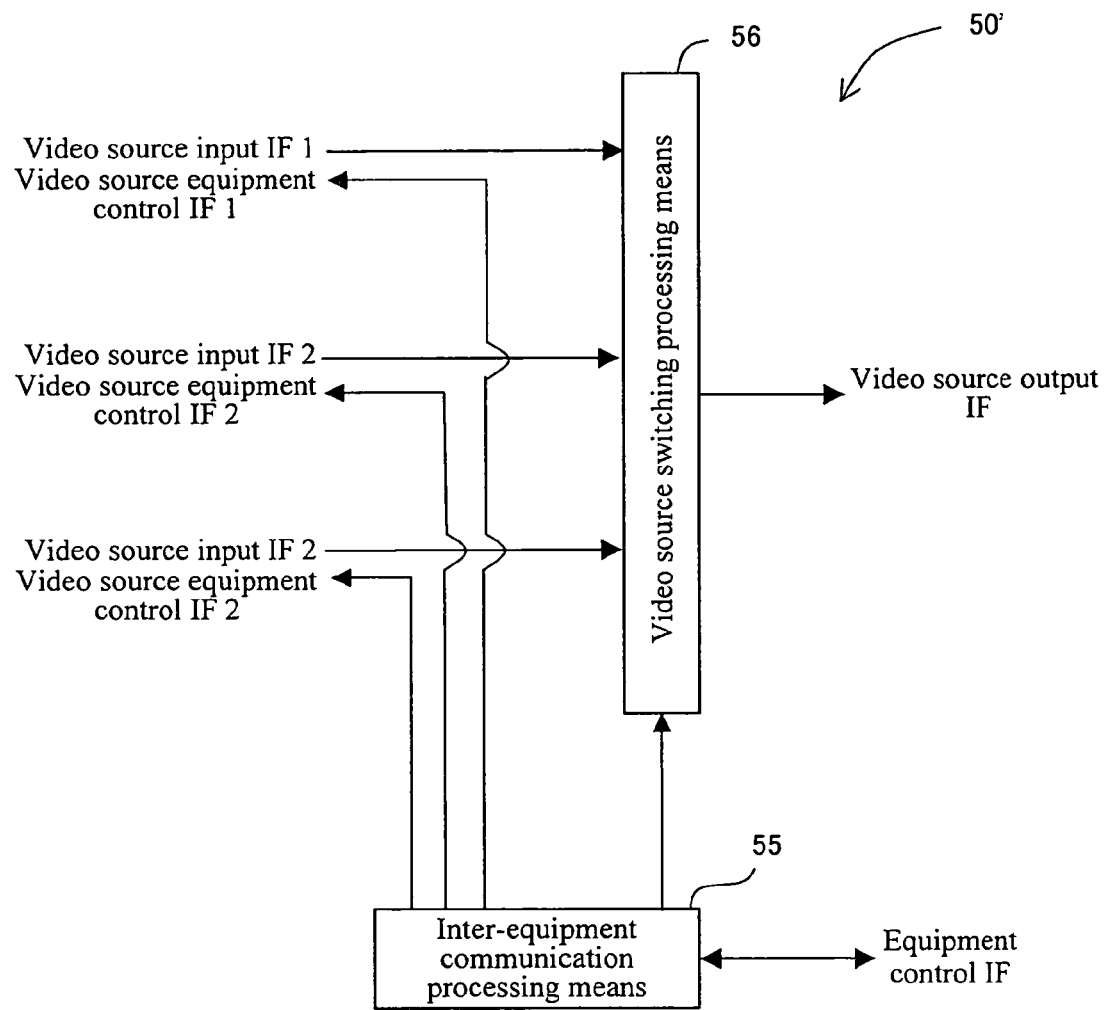
FIG. 24 is a diagram showing the configuration of an example of AV equipment for the transmitter comprising inter-equipment communication processing means according to the sixth embodiment.

The inter-equipment communication processing means 115 carries out the so-called handshake communication procedure with the inter-equipment communication processing means 55 provided in the AV equipment 50', shown in FIG. 24. In this procedure, one of the transmitter 10' and the AV equipment 50' acts as a master, while the other acts as a slave. The master transmits a request to the slave, while the slave returns a response to the request to the master. The communication consists of infrared radio communication based on IrDA (Infrared Data Association) or a short-distance radio communication such as Bluetooth.

FIG. 24 is a diagram showing the configuration of the AV equipment for the transmitter comprising the inter-equipment communication processing means.

The AV equipment 50' has a plurality of (in the illustrated example, three) video source generating sections (not shown in the drawings) connected to the interior of the equipment or external inputs. The video source switching processing means 56 is supplied with video source inputs IF1 to IF3 generated by each of the video source generating sections. On the basis of control by the inter-equipment communication processing means 55, the video source switching processing means 56 selectively supplies one of the video sources IF to the transmitter 10'.

The inter-equipment communication processing means 55 supplies a particular video source generating section with a remote control output supplied as a request by the transmitter 10', acting as the master and specifying that video source generating section. The inter-equipment communication processing means 55 supplies the transmitter 10' with a response to the supplied remote control output. Moreover, the inter-equipment communication processing means 55 specifies a video source input IF to be supplied to the transmitter 10' in association with the remote control output supplied by the transmitter 10' and specifying the video source generating section.

Figure 25:
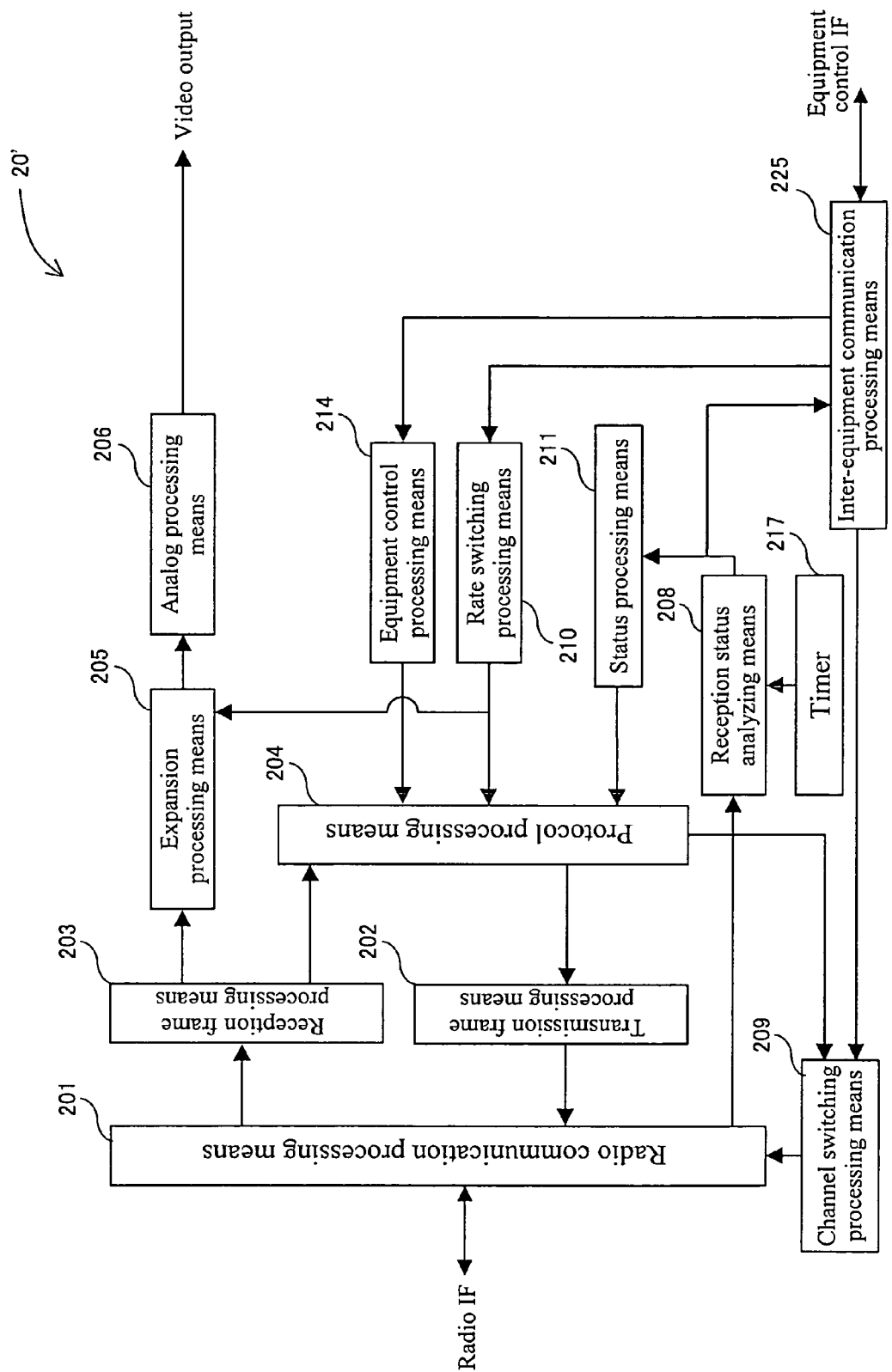
FIG. 25 is a diagram showing the configuration of a receiver according to the sixth embodiment.

In connection with the transmitter 10' configured as described above, the receiver 20' is configured as shown in FIG. 25.

FIG. 25 is a diagram showing the configuration of the receiver according to the present embodiment.

As shown in FIG. 25, the receiver 20' according to the present embodiment differs from receiver 20 according to the first embodiment in that it does not comprise the video display means 207, equipment control SW means 215, rate switching SW means 213, channel switching SW means 212, and reception status display means 216 but comprises an inter-equipment communication processing means 225.

Thus, the receiver 20' supplies the AV equipment 60 with an NTSC analog video signal output by the analog processing means 206, as an interface for video sources.

Further, the inter-equipment communication processing means 225 is supplied with an equipment control instruction, a rate switching instruction, and a channel switching instruction from the AV equipment 60. The inter-equipment communication processing means 225 supplies the AV equipment 60 with a reception status from the reception status analyzing means 208.

Figure 26:
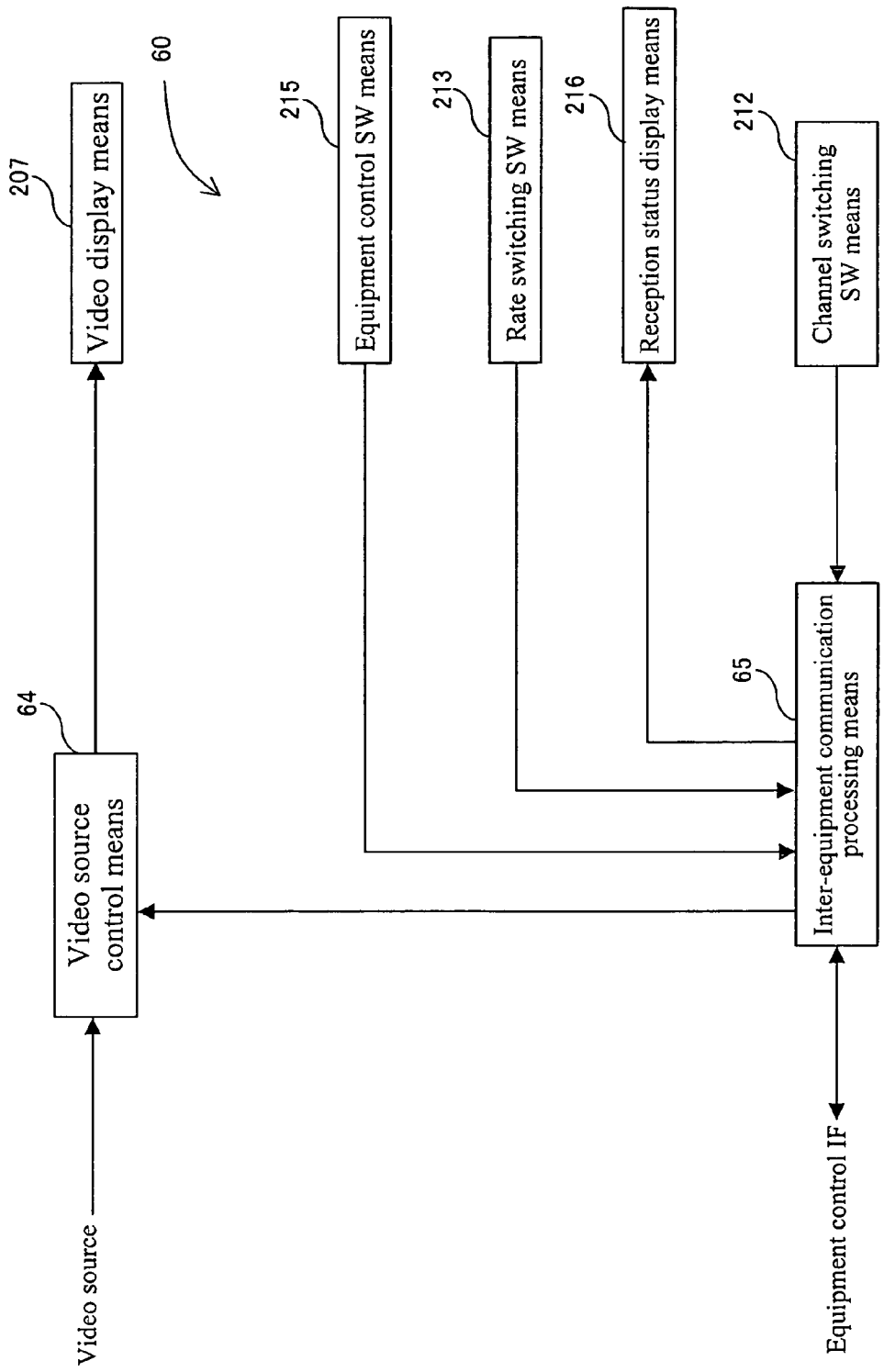
FIG. 26 is a diagram showing the configuration of an example of AV equipment for the receiver comprising inter-equipment communication processing means according to the sixth embodiment.

The inter-equipment communication processing means 225 carries out the so-called handshake communication procedure with the inter-equipment communication processing means 65 provided in the AV equipment 60, shown in FIG. 26. In this procedure, one of the receiver 20' and the AV equipment 60 acts as a master, while the other acts as a slave. The master transmits a request to the slave, while the slave returns a response to the request to the master. The communication consists of infrared radio communication based on IrDA (Infrared Data Association), a short-distance radio communication such as Bluetooth, or wired serial communication based on RS232C.

FIG. 26 is a diagram showing the configuration of an example of the AV equipment for the receiver comprising the inter-equipment communication processing means.

The AV equipment 60 comprises the video display means 207, equipment control SW means 215, rate switching SW means 213, channel switching SW means 212, and reception status display means 216, as well as video source control means 64 and inter-equipment communication processing means 65.

The receiver 20' supplies the video source control means 64 with an NTSC analog video signal as an interface for video sources. The video source control means 64 supplies an NTSC analog video signal to the video display means 207 for control on the basis of control performed by the inter-equipment communication processing means 55.

The inter-equipment communication processing means 65 is supplied with an equipment control instruction from the equipment control SW means 215, a rate switching instruction from the rate switching SW means 213, and a channel switching instruction from the channel switching SW means 212. The inter-equipment communication processing means 65 provides the supplied instructions to the inter-equipment communication processing means 225 of the slave receiver 20' as requests from the master. The inter-equipment communication processing means 65 also acts as a slave to receive the reception status determined by the reception status analyzing means 208 and supplied by the inter-equipment communication processing means 225 of the master receiver 20'. The inter-equipment communication processing means 65 supplies the reception status to the reception status display means 216, which then displays the reception status. Moreover, the inter-equipment communication processing means 65 also supplies the reception status to the video source control means 64. The video source control means 64 controls the display by the video display means 207 according to the reception status.

Figure 27:
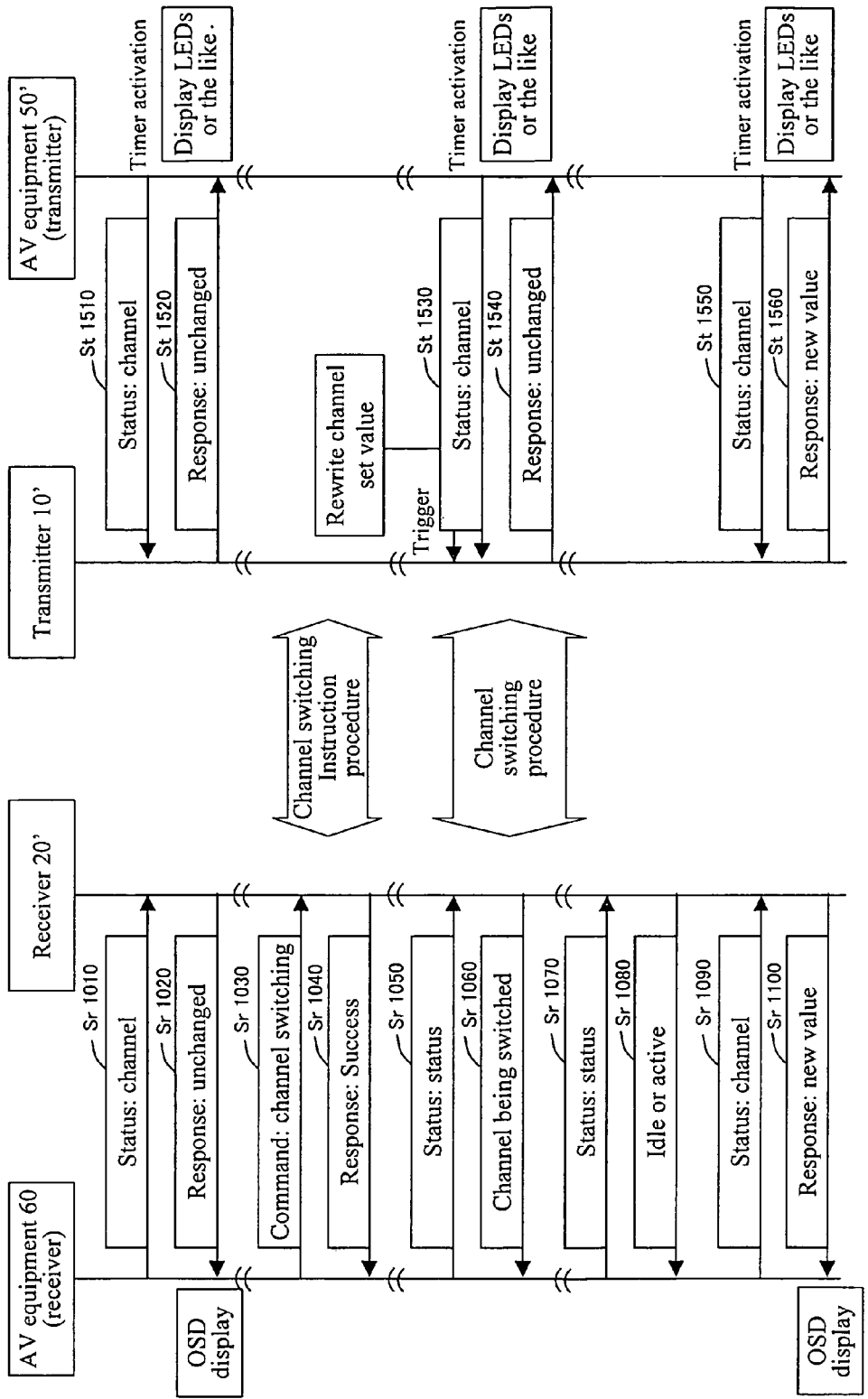
FIG. 27 is a diagram showing a sequence executed by the AV equipment for the receiver and the AV equipment for the transmitter if an appropriate radio environment is present between the receiver and the transmitter.
Figure 28:
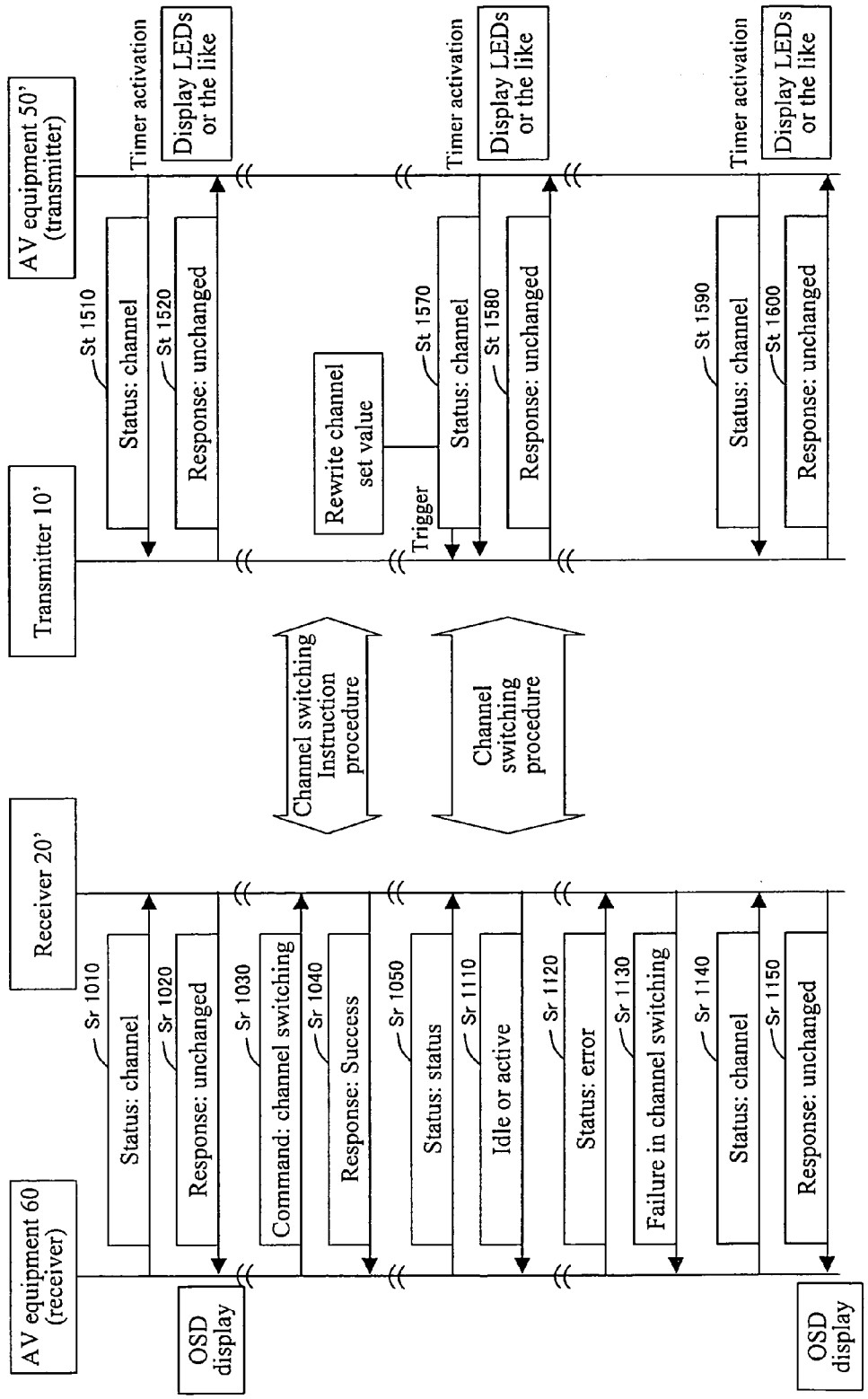
FIG. 28 is a diagram showing a sequence executed by the AV equipment for the receiver and the AV equipment for the transmitter if an inappropriate radio environment is present between the receiver and the transmitter.
Figure 29:
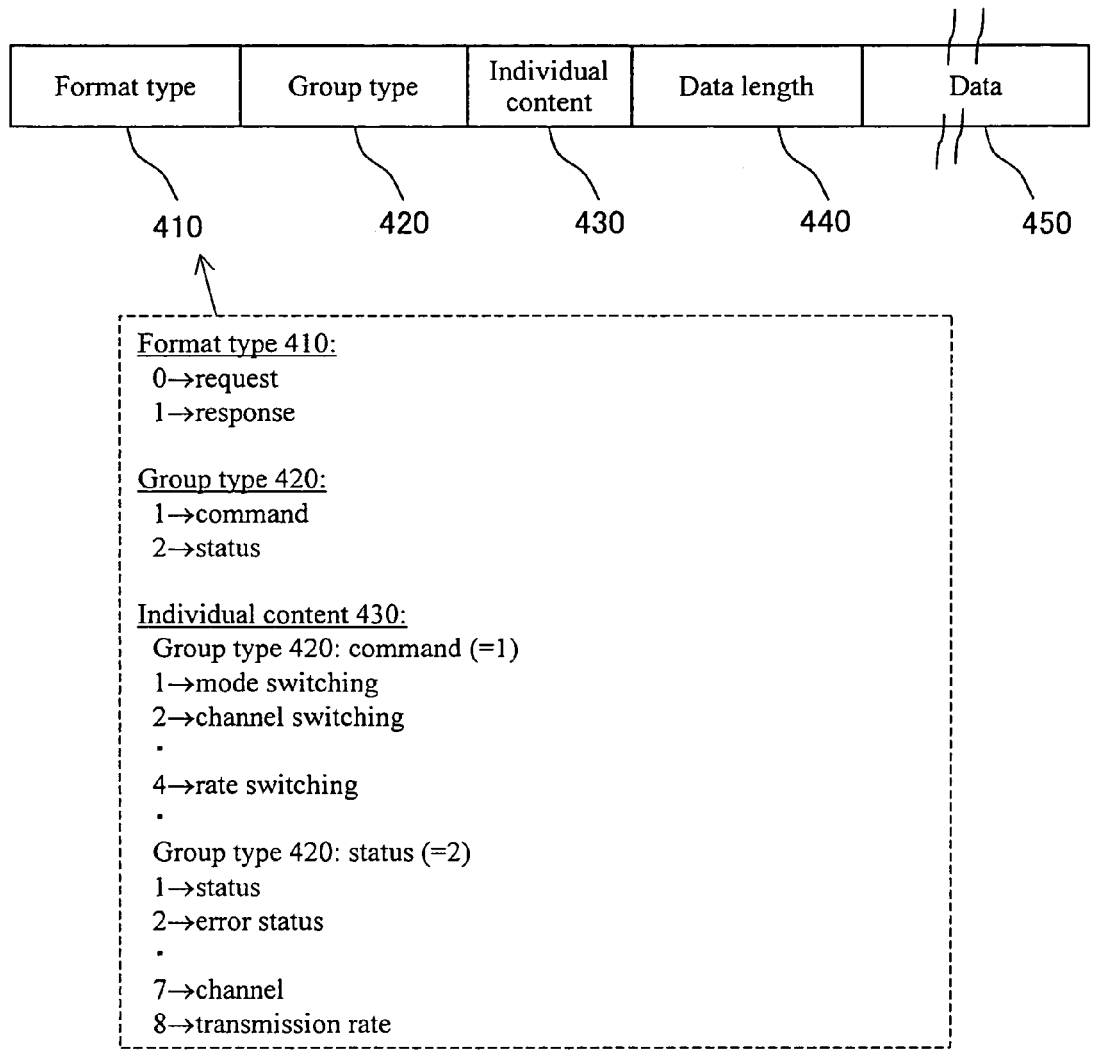
FIG. 29 is a diagram illustrating a format used in radio communications using handshake communication between the inter-equipment communication processing means of the receiver AV equipment and receiver and between the inter-equipment communication processing means of the transmitter AV equipment and transmitter.

With reference to FIGS. 27 to 29, description will be given of the case in which in the radio video transmission system according to the present embodiment configured as described above, the AV equipment 60 for the receiver switches the transmission channel for video data transmitted by the AV equipment 50' for the transmitter to the AV equipment 60 for the receiver.

FIG. 27 shows a sequence for the receiver AV equipment and the transmitter AV equipment which sequence is used if the radio environment between the receiver and the transmitter is appropriate.

FIG. 28 shows a sequence for the receiver AV equipment and the transmitter AV equipment which sequence is used if the radio environment between the receiver and the transmitter is inappropriate.

FIG. 29 is a diagram illustrating a format used for radio or wired communication using the handshake between the inter-equipment communication processing means of the receiver AV equipment and receiver and between the inter-equipment communication processing means of the transmitter AV equipment and transmitter.

For example, a format 400 shown in FIG. 29 is used to make communication between the inter-equipment communication processing means 65 and 225 of the AV equipment 60 and receiver 20' and between the inter-equipment communication processing means 55 and 115 of the AV equipment 50' and transmitter 10'.

The format 400 is composed of the type 410 of the format, a group type 420, the individual content 430 of each group type, the length 440 of data, and data 450.

Of these components, the type 410 indicates whether the format is a request for or a response to the inter-equipment communication processing means 65, 225, 55, or 115. In the present example, the value of "0" indicates a request, while the value of "1" indicates a response.

The group type 420 indicates the type of the succeeding content 430 and data 450. In the present example, the value of "1" indicates that the content 430 and data 450 correspond to a command transmitted to the inter-equipment communication processing means 65, 225, 55, or 115. The value of "2" indicates that the content 430 and data 450 correspond to an inquiry or response about the status transmitted to the inter-equipment communication processing means 65, 225, 55, or 115. That is, different contents 430 and data 450 are specified for the respective values.

The individual content 430 indicates the content of each group type. In the present example, if the group type 420 is a command, when its value is "1", the content of the command is mode switching required to pair the inter-equipment communication processing means 65 and 225 or 55 and 115. Likewise, when the value is "2", the content of the command is channel switching required to switch the channel (that is, frequency) for the communication between the paired inter-equipment communication processing means 65 and 225 or 55 and 115. Similarly, when the value is "4", the content of the command is rate switching in which the transmission rate is switched. That is, different contents of commands are specified for the respective values. Similarly, if the group type 420 is a status, when its value is "1", the content of the status is the status of one or the other of the paired inter-equipment communication processing means 65 and 225 or 55 and 115. When the value is "2", the content of the status is an error in one or the other of the paired inter-equipment communication processing means 65 and 225 or 55 and 115. When the value is "7", the content of the status is an inquiry or response about the channel transmitted to any of the inter-equipment communication processing means 65, 225, 55, and 115. When the value is "8", the content of the status is an inquiry or response about the transmission rate transmitted to any of the inter-equipment communication processing means 65, 225, 55, and 115. That is, different contents of statuses are specified for the respective values.

The data length 440 indicates the length of the succeeding data 450. The data 450 is the data specified by the type 410, group type 420, and individual content 430.

The receiver AV equipment 60 switches the transmission channel for video data transmitted from the transmitter AV equipment 50' to the receiver AV equipment 60, using the format used for the radio or wired communication between the inter-equipment communication processing means 65 and 225 or 55 and 115. The switching is executed as described below.

In FIG. 27, if for example, the user operates the channel switching SW means 312 (see FIG. 26) of the receiver AV equipment 60, the receiver AV equipment 60 transmits a channel request from the inter-equipment communication processing means 65 (see FIG. 26) to the receiver 20' as a status (step Sr1010).

When the channel request is supplied to the inter-equipment communication processing means 225 (see FIG. 25), the receiver 20' acquires, from the channel switching processing means 209, the connection channel between the receiver 20' and the transmitter 10' which has not been changed by the inter-equipment communication processing means 225 yet (that is, the current connection channel). The receiver 20' then returns the connection channel to the AV equipment 60 as a response to the channel request from the AV equipment 60 (step Sr1020).

In the AV equipment 60, the inter-equipment communication processing means 65 supplies the video source control means 64 with unchanged connection channel returned by the receiver 20' as a response. The video source control means 64 causes the video display means 207 to subject the connection channel to OSD display.

In this manner, the request and response for the unchanged channel allow both the inter-equipment communication processing means 65 of the AV equipment 60 and the inter-equipment communication processing means 225 of the receiver 20' to confirm that channel switching has been started. The inter-equipment communication processing means 65 of the AV equipment 60 then transmits an instruction on channel switching to the receiver 20' as a command (step Sr1030).

When the instruction on channel switching is supplied to the inter-equipment communication processing means 225 (see FIG. 25) of the receiver 20' as a command, the inter-equipment communication processing means 225 provides the instruction of channel switching to the channel switching processing means 209. The inter-equipment communication processing means 225 also returns a response to the receiver 20' indicating that the instruction has been successfully accepted (step Sr1040). Thus, in the receiver 20', the channel switching processing means 209 cooperates with the radio communication processing means 201 in executing the connection procedure process described in FIG. 10, between itself and transmitter 10'.

Upon reception of the response from the receiver 20', the inter-equipment communication processing means 65 of the AV equipment 60 confirms that the receiver 20' has accepted the command instructing the channel to be switched. The inter-equipment communication processing means 65 then transmits a request for the status to the receiver 20' (steps Sr1050 and Sr1070).

The inter-equipment communication processing means 225 of the receiver 20' returns, to the AV equipment 60, a response to the status request from the AV equipment 60; the response indicates that the channel is being switched if the channel switching processing means 209 is executing a channel switching process or indicates an idle or active status if the channel switching process has been finished (steps Sr1060 and Sr1080).

Accordingly, the inter-equipment communication processing means 65 of the AV equipment 60 periodically repeats transmitting the status request to the receiver 20' until it receives the response indicating the idle or active status from the receiver 20'.

Upon reception of the response indicating the idle or active status from the receiver 20', the inter-equipment communication processing means 65 of the AV equipment 60 transmits a request for the channel as a status to the receiver 20' again (step Sr1090).

Then, the inter-equipment communication processing means 225 of the receiver 20' acquires the changed connection channel between the receiver 20' and the transmitter 10' (that is, the current connection channel) from the channel switching processing means 209. The inter-equipment communication processing means 225 then returns the connection channel to the AV equipment 60 as a response to the channel request from the AV equipment 60 (step Sr1100). The inter-equipment communication processing means 65 of the AV equipment 60 supplies the video source control means 64 with the switched new channel returned to the AV equipment 60 by the receiver 20'. The new channel is then OSD displayed on the video display means 207.

Correspondingly, the inter-equipment communication processing means 55 of the transmitter AV equipment 50' is activated by the timer to periodically transmit a request for the channel as a status to the inter-equipment communication processing means 115 of the transmitter 10' (step St1510).

If in spite of the request for the channel as a status from the AV equipment 50', the channel switching processing means has not executed the connection procedure process described in FIG. 9 on the basis of the instruction on channel switching, using the receiver AV equipment 60, the inter-equipment communication processing means 115 of the transmitter 10' acquires the unchanged (current) channel from the channel switching processing means 109. The inter-equipment communication processing means 115 then returns the channel to the AV equipment 50' as a response (step St1520). The unchanged channel returned to the AV equipment 50' by the transmitter 10' as a response is supplied to display means consisting of LEDs or the like (not shown in the drawings) provided in the AV equipment 50'. The display means then display the channel.

On the other hand, if the channel switching processing means 109 has executed the connection procedure process described in FIG. 9 on the basis of the instruction on channel switching, using the receiver AV equipment 60, the channel switching processing means 109 has rewritten the channel set value.

Consequently, after the channel set value is rewritten, the inter-equipment communication processing means 115 of the transmitter 10' returns the switched new (current) channel to the AV equipment 50' (step St1560) in response to the request* for the channel as a status transmitted by the inter-equipment communication processing means 55 of the AV equipment 50' (step St1550).

The channel is switched as described above if the radio environment between the receiver 20' and the transmitter 10' is appropriate. In contrast, the sequence shown in FIG. 28 is executed if the radio environment between the receiver 20' and the transmitter 10' is inappropriate.

That is, as previously described, upon confirming that the receiver 20' has accepted the command instructing the channel to be switched (step Sr1040), the inter-equipment communication processing means 65 of the AV equipment 60 transmits a request for the status to the receiver 20' (step Sr1050).

However, if the radio environment between the receiver 20' and the transmitter 10' is inappropriate, the receiver 20' cannot receive a connection response from the transmitter 10' even if it executes the connection procedure process described in FIG. 10 using the command from the AV equipment 60 instructing the channel to be switched. Thus, the receiver 20' uses the channel switching processing means 209 to continuously execute the connection procedure process or remains idle or active owing to suspension resulting from this continuous state. As a result, in spite of the request for the status from the AV equipment 60, the inter-equipment communication processing means 225 of the receiver 20' cannot indicate that the channel is being switched as a response. As a result, the inter-equipment communication processing means 225 returns the idle or active status to the AV equipment 60 (step Sr1110).

If the inter-equipment communication processing means 65 of the AV equipment 60 continuously receives the response indicating the idle or active status from the receiver 20' for, for example, at least a predetermined time without receiving the response indicating that the channel is being switched, it transmits a request for an error as a status to the receiver 20' (step Sr1120). Then, the inter-equipment communication processing means 225 of the receiver 20' returns a failure in channel switching as a response (step Sr1130).

Then, the inter-equipment communication processing means 65 of the AV equipment 60 transmits a request for the channel as a status to the receiver 20' (step Sr1140). In response to this, the inter-equipment communication processing means 225 of the receiver 20' returns the unchanged channel to the AV equipment 50' (step Sr1150). The inter-equipment communication processing means 65 of the AV equipment 60 supplies the failure in channel switching and the unchanged channel to the video source control means 64 of the AV equipment 60. The inter-equipment communication processing means 65 thus causes the video display means 207 to subject the failure in channel switching and to OSD display the channel so that the user can confirm them.

Correspondingly, the inter-equipment communication processing means 55 of the transmitter AV equipment 50' is activated by the timer to periodically transmit a request for the channel as a status to the inter-equipment communication processing means 115 of the transmitter 10' as previously described (step St1510). However, since the radio environment between the receiver 20' and the transmitter 10' is inappropriate, the inter-equipment communication processing means 115 of the transmitter 1O' returns the unchanged (current) channel to the AV equipment 50' (step St1590) in response to the request for the channel as a status transmitted by the inter-equipment communication processing means 55 of the AV equipment 50' (step St1590).

In spite of the inappropriate radio environment between the receiver 20' and the transmitter 10', if this state is improved at all to enable the radio communication between the receiver 20' and the transmitter 10' using a particular channel, the current channel is automatically switched to the new one with the improved radio environment as in the case of the first embodiment.

In the description of the above example, the transmission channel for video data is switched. However, the description also applies to, for example, switching of the transmission rate.

According to the radio video transmission system according to the present embodiment configured as described above, in the series of processes shown in FIGS. 8 to 17, the receiver 20' switches the channel by automatically determining that the radio environment is inappropriate or on the basis of the user's intension to enable the video source to be viewed and listened to over the new channel with the improved radio environment, as in the case of the radio video transmission system according to the previously described embodiment. Further, the AV equipment 60 (receiver) and the AV equipment 50' (transmitter) need not know the complicated mechanism of radio video transmission. The AV equipment 60 and the AV equipment 50' can accomplish radio video transmission provided that they comprise at least a pair of inter-equipment communication processing means (at least one equipment control IF).

As described above, even if the radio environment is degraded to the degree that data cannot be transmitted, radio video transmission can be executed by operating the AV equipment 60, connected to the receiver 20', to switch the channel between the transmitter 10' and the receiver 20'.

The present invention is as described in the above embodiments but is not limited to them.

For example, in the fifth embodiment, switching of the channel or transmission rate or composite switching of both channel and transmission rate may be executed according only to the value of the current error rate instead of the change rate based on the ratio of the last error rate and the current error rate.

Furthermore, in the sixth embodiment, the control configuration described in the second to fifth embodiments may be employed in place of the control configuration described in the first embodiment.

INDUSTRIAL APPLICABILITY

As described above, according to the present invention, status information is periodically transmitted between the receiver and the transmitter. Then, a failure to receive the status information is used as a trigger for channel switching. This enables the radio transmission channel to be reliably switched when the radio environment is degraded to the degree that data communication is disabled. Consequently, even if the radio environment is significantly degraded, video can be appropriately transmitted by switching the radio frequency band or the video data compression rate.

The invention claimed is:

1. A radio video transmission system which transmits video data from a transmitter to a receiver by radio, the radio video transmission system comprising:
   a detecting means for detecting interruption of communication of data periodically transmitted by the receiver; and
   a channel switching means for switching a channel through which video data is transmitted to the receiver, in response to the detection, by the detecting means, of the interruption of the communication, wherein
   the channel switching unit comprises a timer that counts a channel switching time to set a power saving mode when a predetermined time has been clocked.

2. The radio video transmission system according to claim 1, wherein the data periodically transmitted by the receiver is transmitted data comprising a status of reception, by the receiver, of the video data transmitted by the transmitter, the transmitted data being periodically transmitted from the receiver to the transmitter by reception status transmitting means.

3. The radio video transmission system according to claim 2, wherein the channel switching unit comprises a timer that counts a channel switching time to set a power saving mode when a predetermined time has been clocked.

4. The radio video transmission system according to claim 2, wherein at least one of the receiver and transmitter is a communication apparatus connected to AV equipment by inter-equipment communication.

5. The radio video transmission system according to claim 1, wherein at least one of the receiver and transmitter is a communication apparatus connected to AV equipment by inter-equipment communication.

6. The radio video transmission system according to claim 1, wherein at least one of the receiver and transmitter is a communication apparatus connected to AV equipment by inter-equipment communication.

7. A method for radio video transmission which transmits video data from a transmitter to a receiver by radio, the method comprising:
   causing a receiver to periodically transmit video data;
   detecting interruption of communication of data periodically transmitted by the receiver; and
   switching a channel through which video data is transmitted to the receiver, when the interruption of the data communication with the receiver is detected, wherein
   the channel switching unit comprises a timer that counts a channel switching time to set a power saving mode when a predetermined time has been clocked.

* * * * *